Dec. 7, 1965  W. R. BAKER ETAL  3,221,669
APPARATUS FOR SHIPPING VEHICLES
Filed June 22, 1962  12 Sheets-Sheet 1
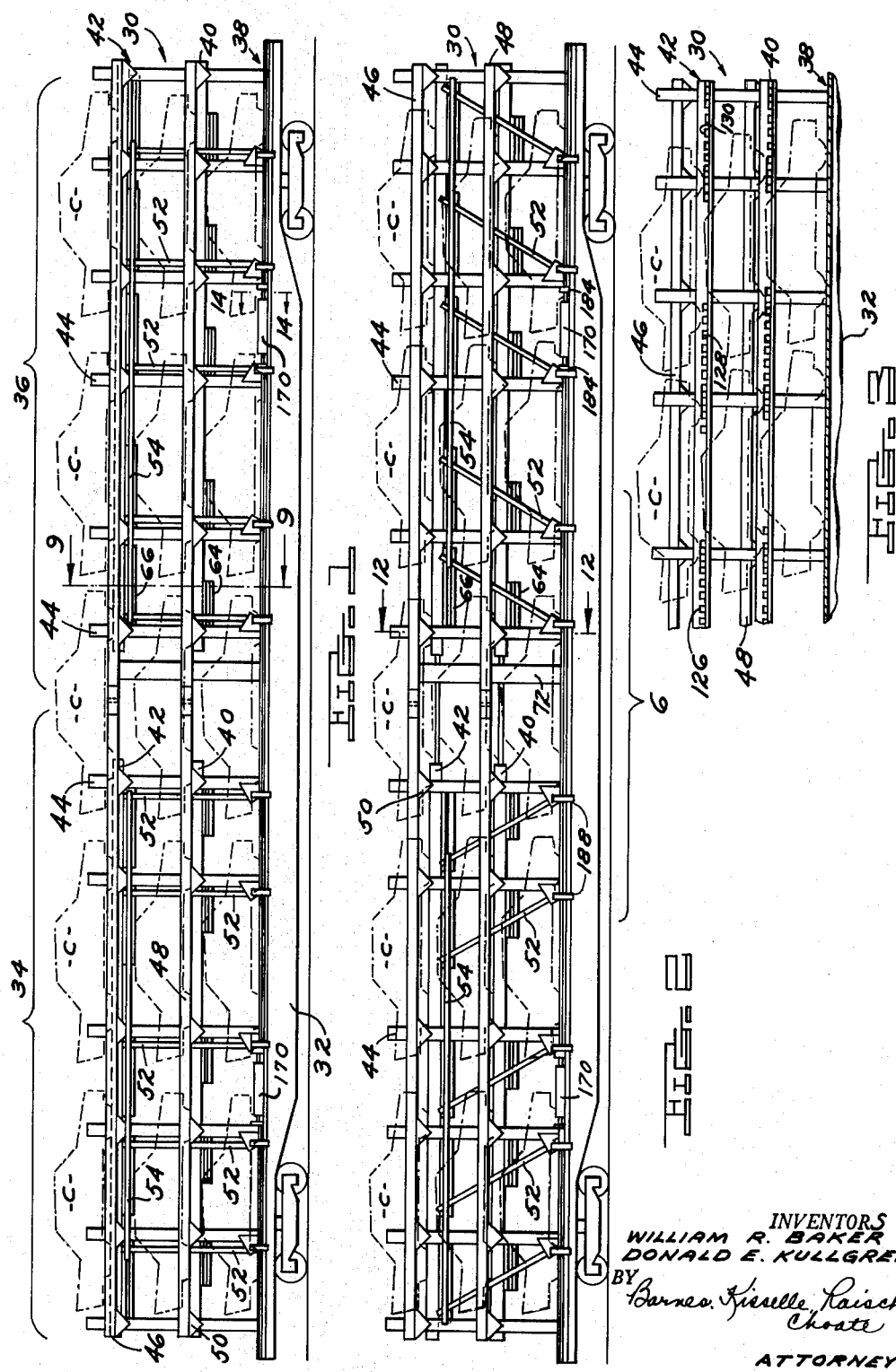
INVENTORS
WILLIAM R. BAKER
DONALD E. KULLGREN
BY
Barnes, Kisselle, Raisch & Choate
ATTORNEYS

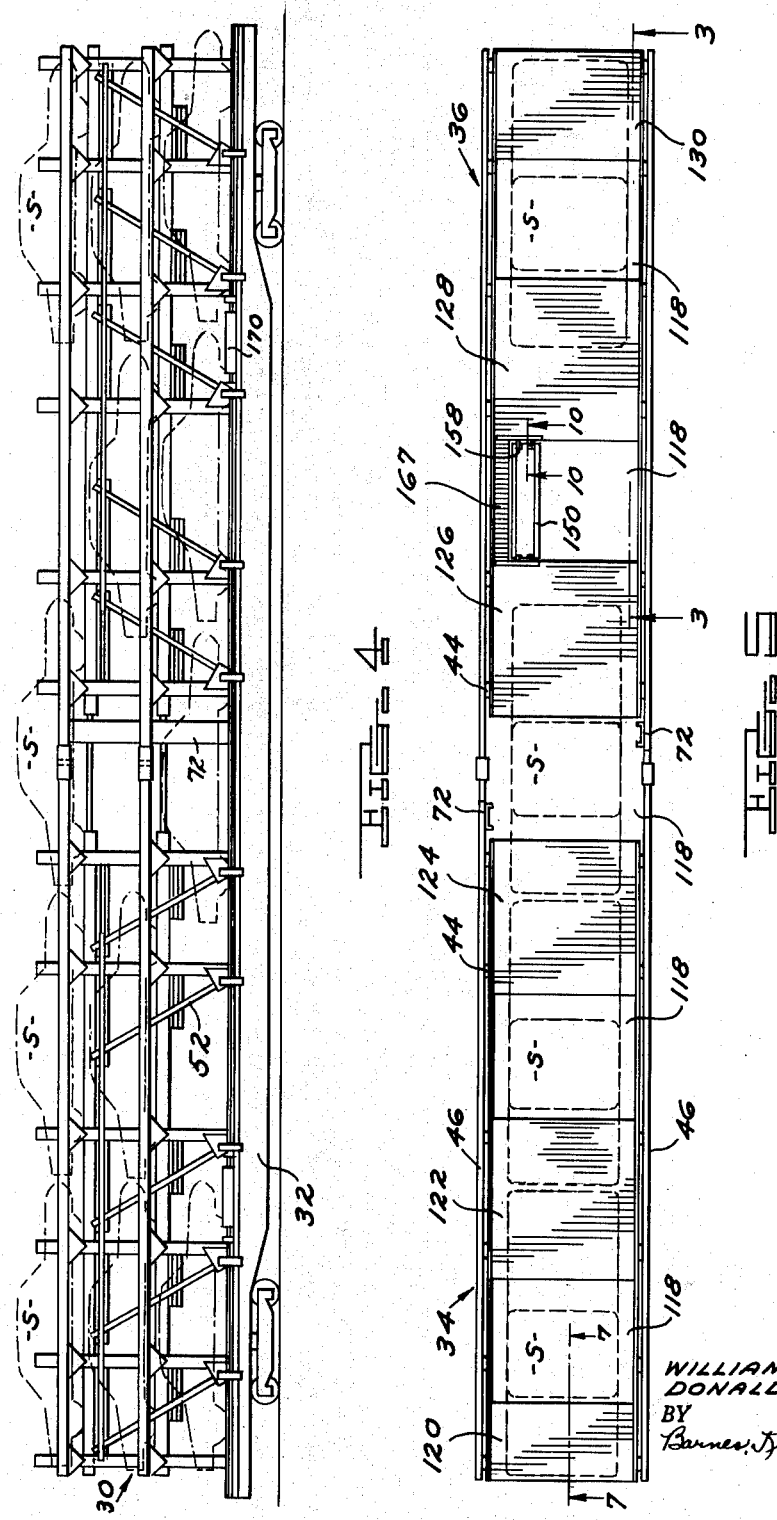

Dec. 7, 1965   W. R. BAKER ETAL   3,221,669
APPARATUS FOR SHIPPING VEHICLES
Filed June 22, 1962   12 Sheets-Sheet 3
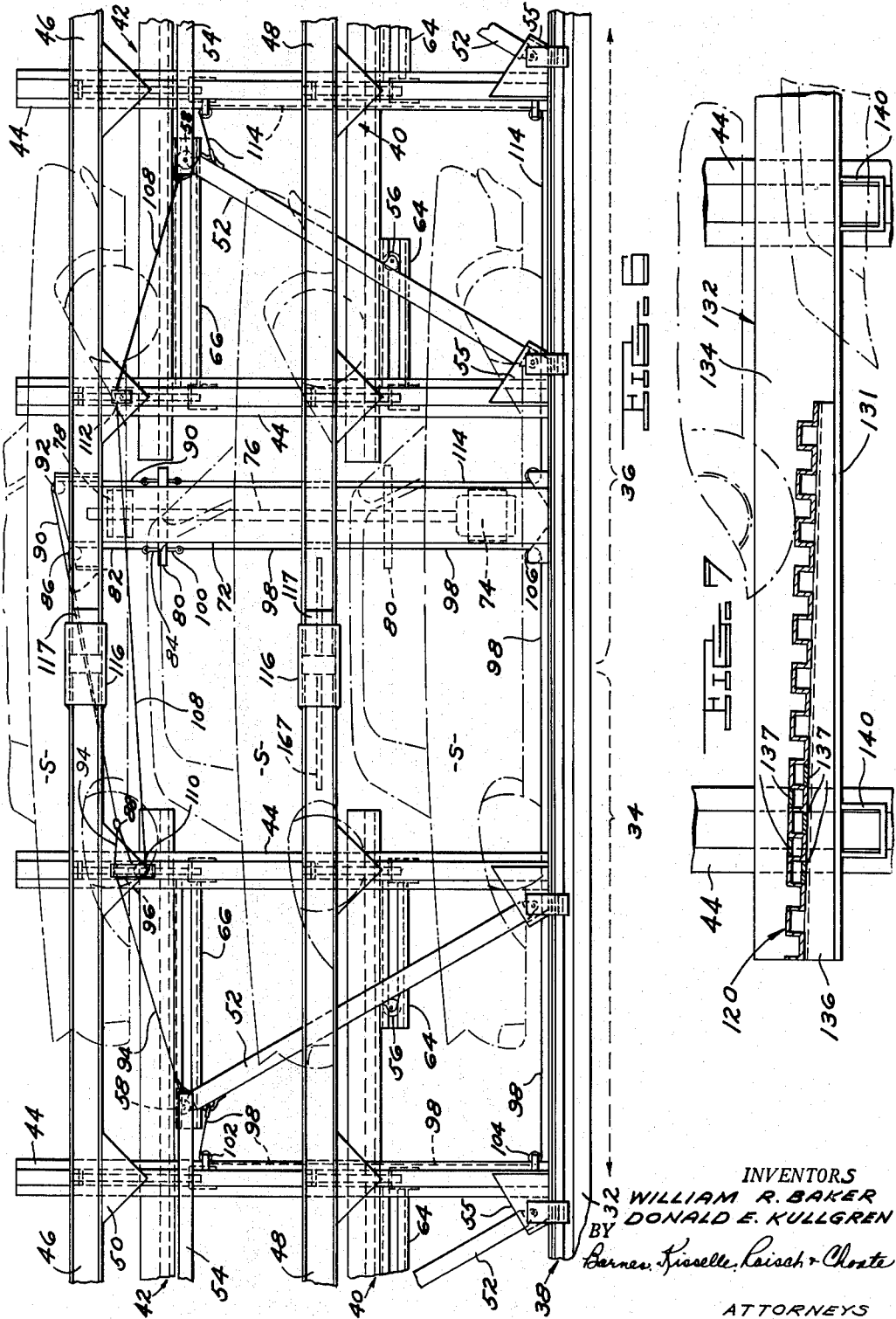
INVENTORS
WILLIAM R. BAKER
DONALD E. KULLGREN
BY
Barnes, Kisselle, Raisch & Choate
ATTORNEYS Dec. 7, 1965   W. R. BAKER ETAL   3,221,669
APPARATUS FOR SHIPPING VEHICLES
Filed June 22, 1962   12 Sheets-Sheet 4
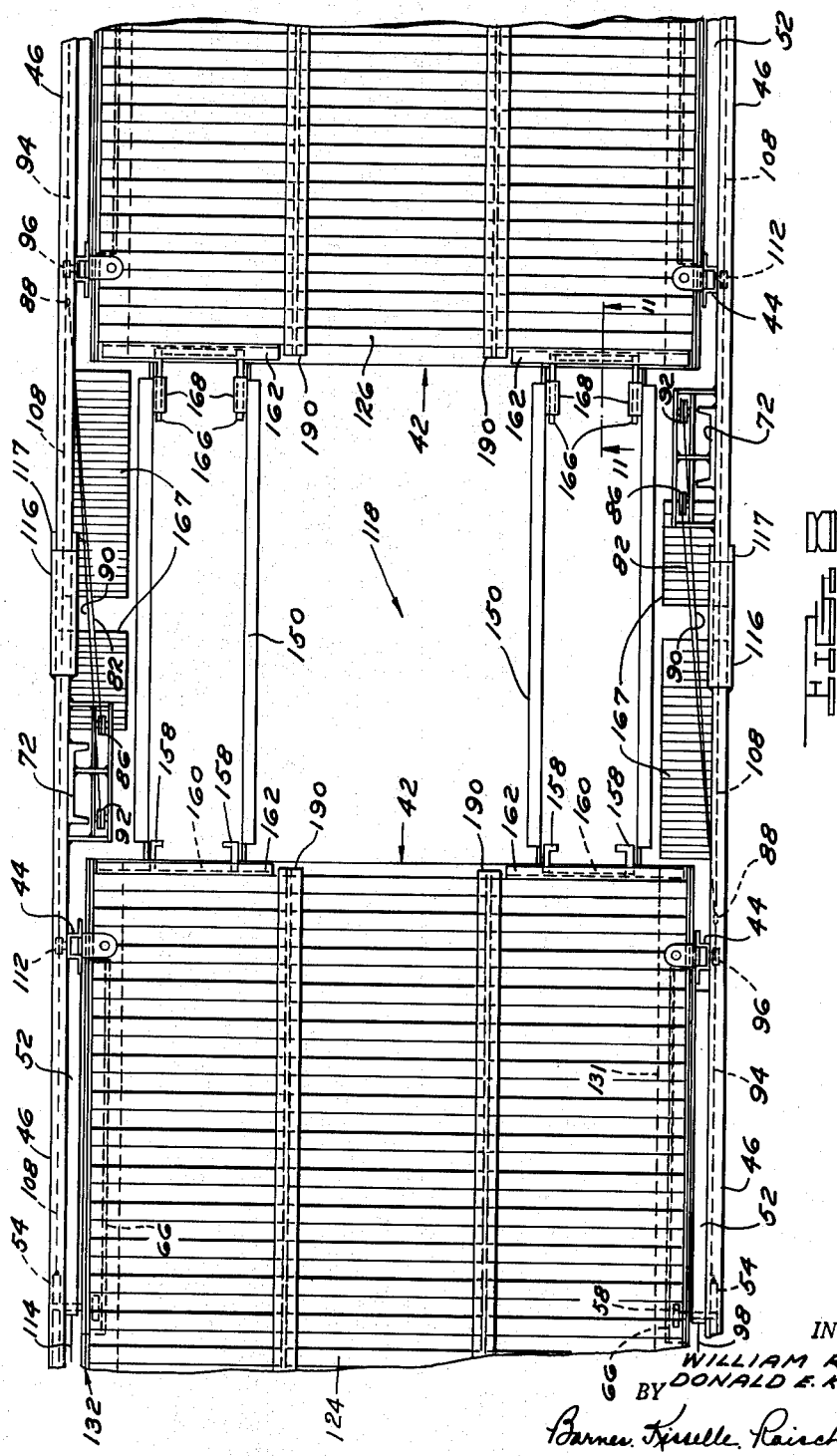
INVENTORS
WILLIAM R. BAKER
DONALD E. KULLGREN
BY
Barnes, Kisselle, Raisch & Choate
ATTORNEYS

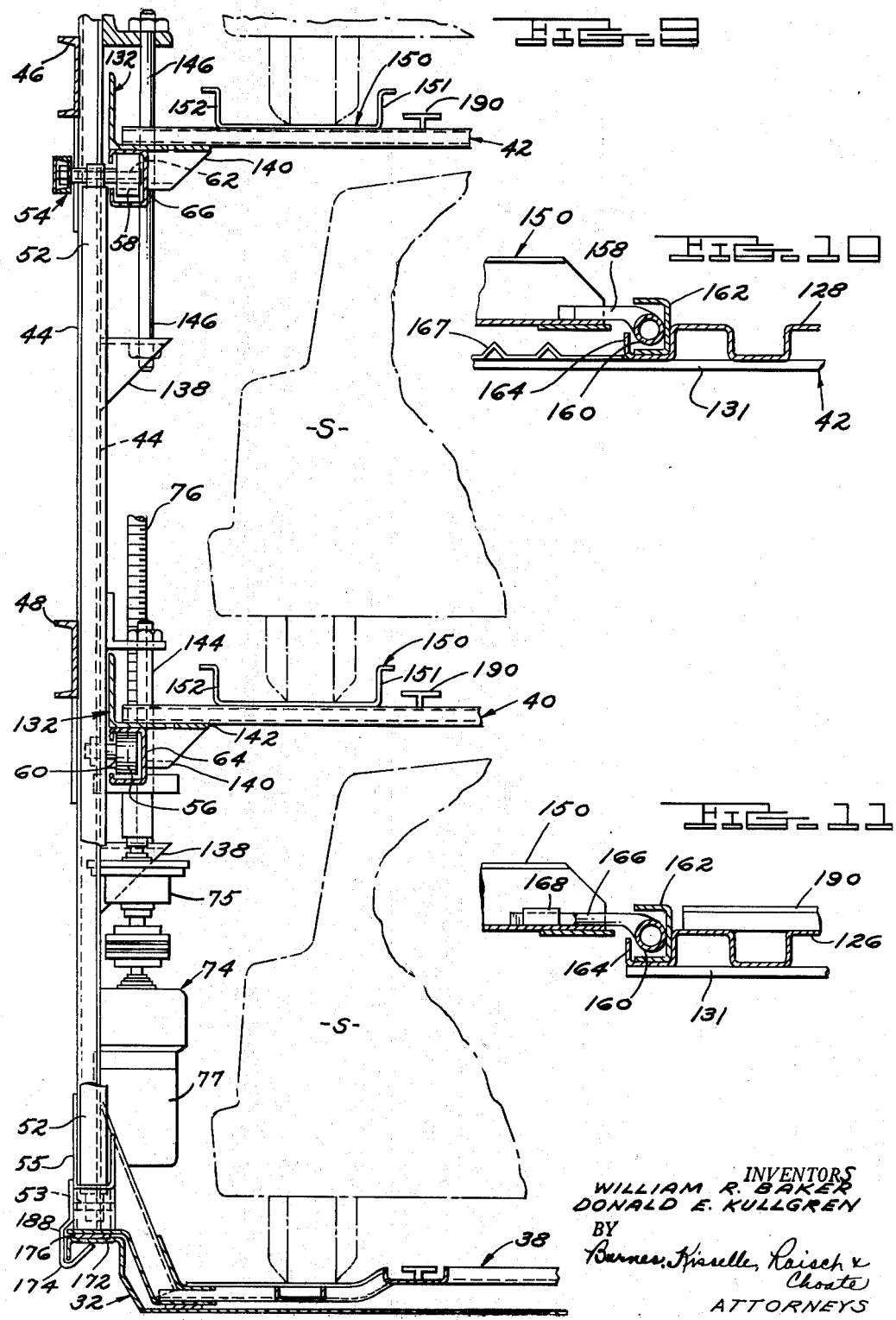

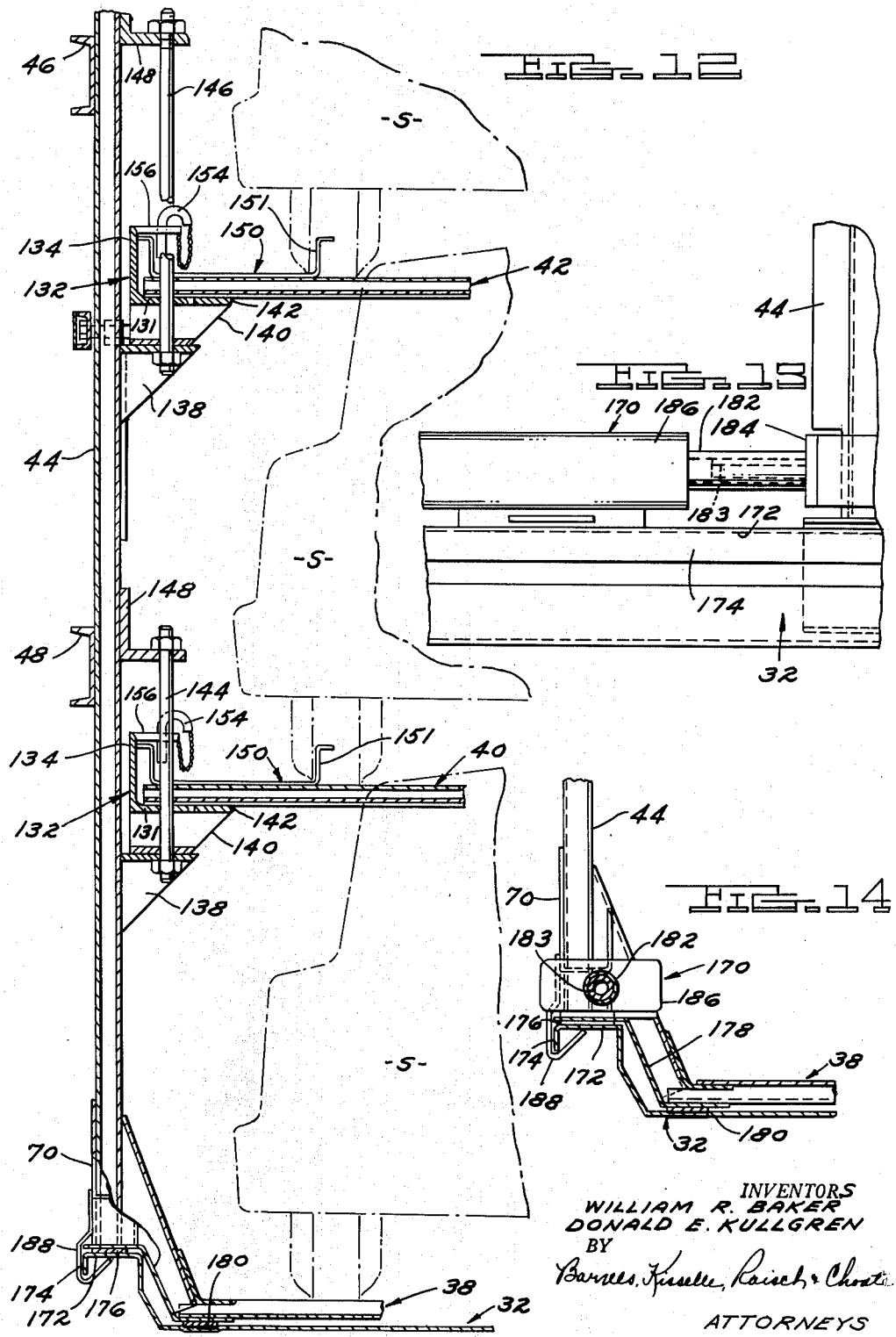

Dec. 7, 1965 W. R. BAKER ETAL 3,221,669
APPARATUS FOR SHIPPING VEHICLES
Filed June 22, 1962 12 Sheets-Sheet 7

INVENTORS
WILLIAM R. BAKER
DONALD E. KULLGREN
BY
Barnes, Kisselle, Raisch & Choate
ATTORNEYS Dec. 7, 1965   W. R. BAKER ETAL   3,221,669
APPARATUS FOR SHIPPING VEHICLES
Filed June 22, 1962   12 Sheets-Sheet 8
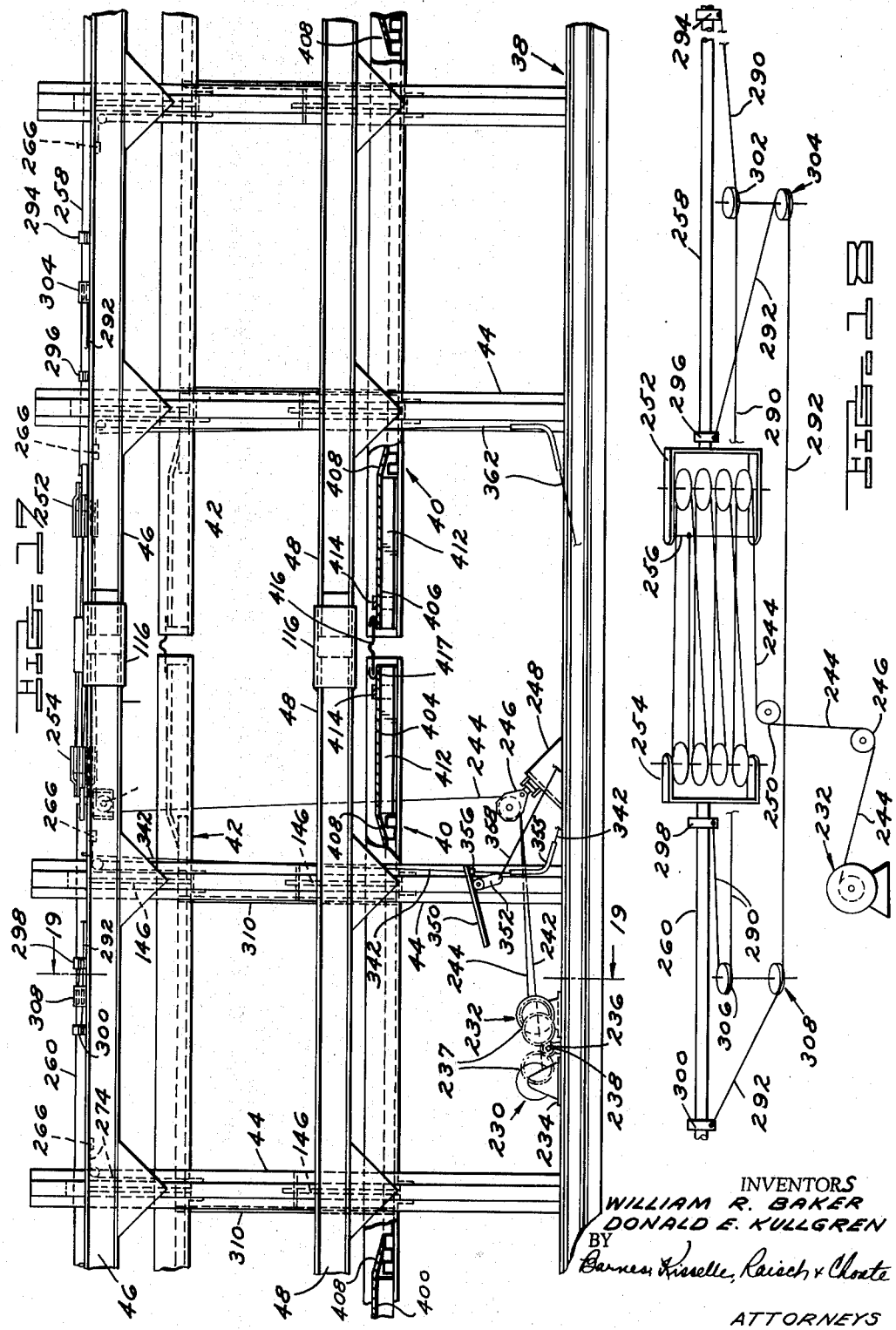
INVENTORS
WILLIAM R. BAKER
DONALD E. KULLGREN
BY
Barnes, Kisselle, Raisch & Choate
ATTORNEYS

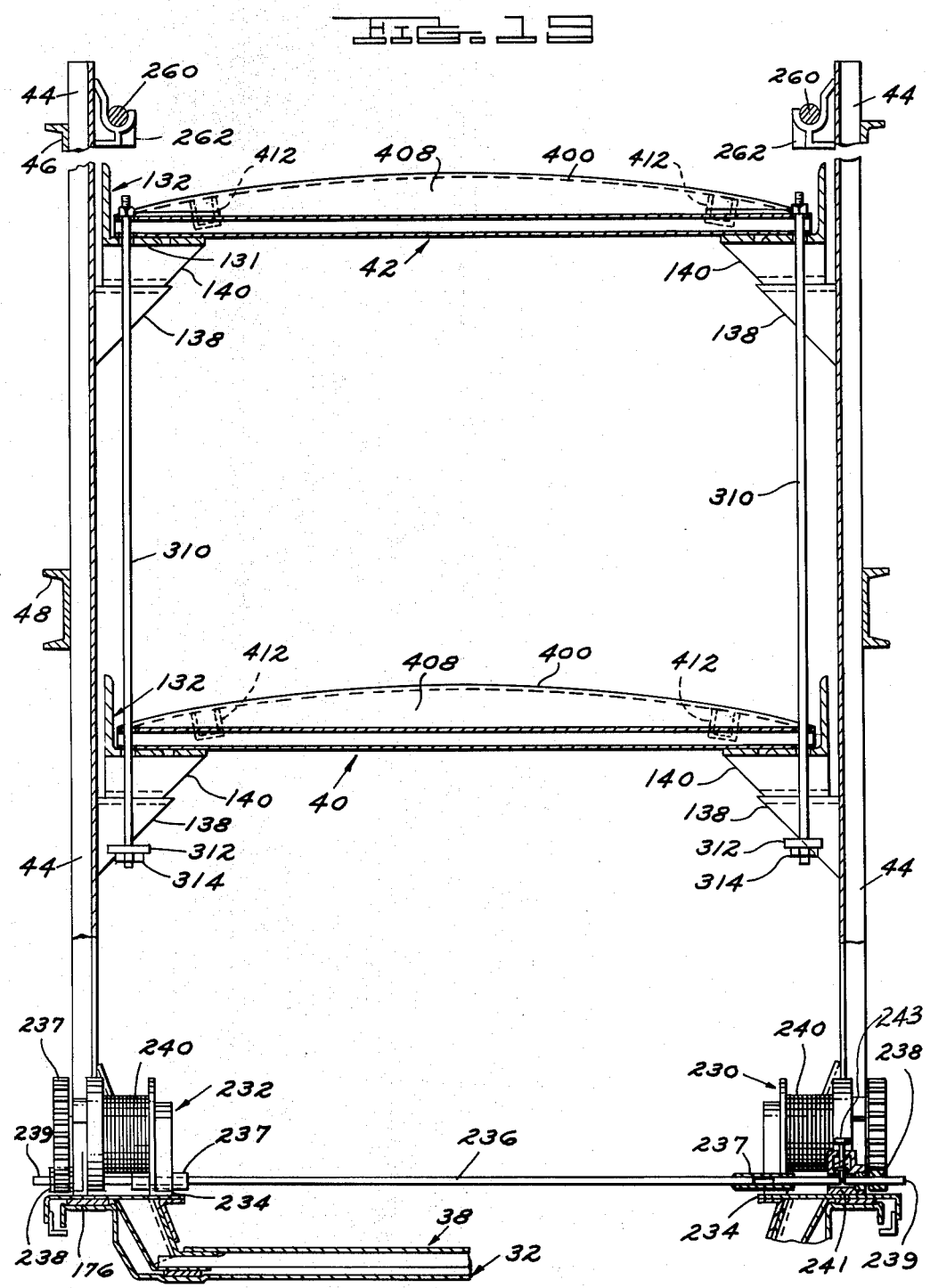

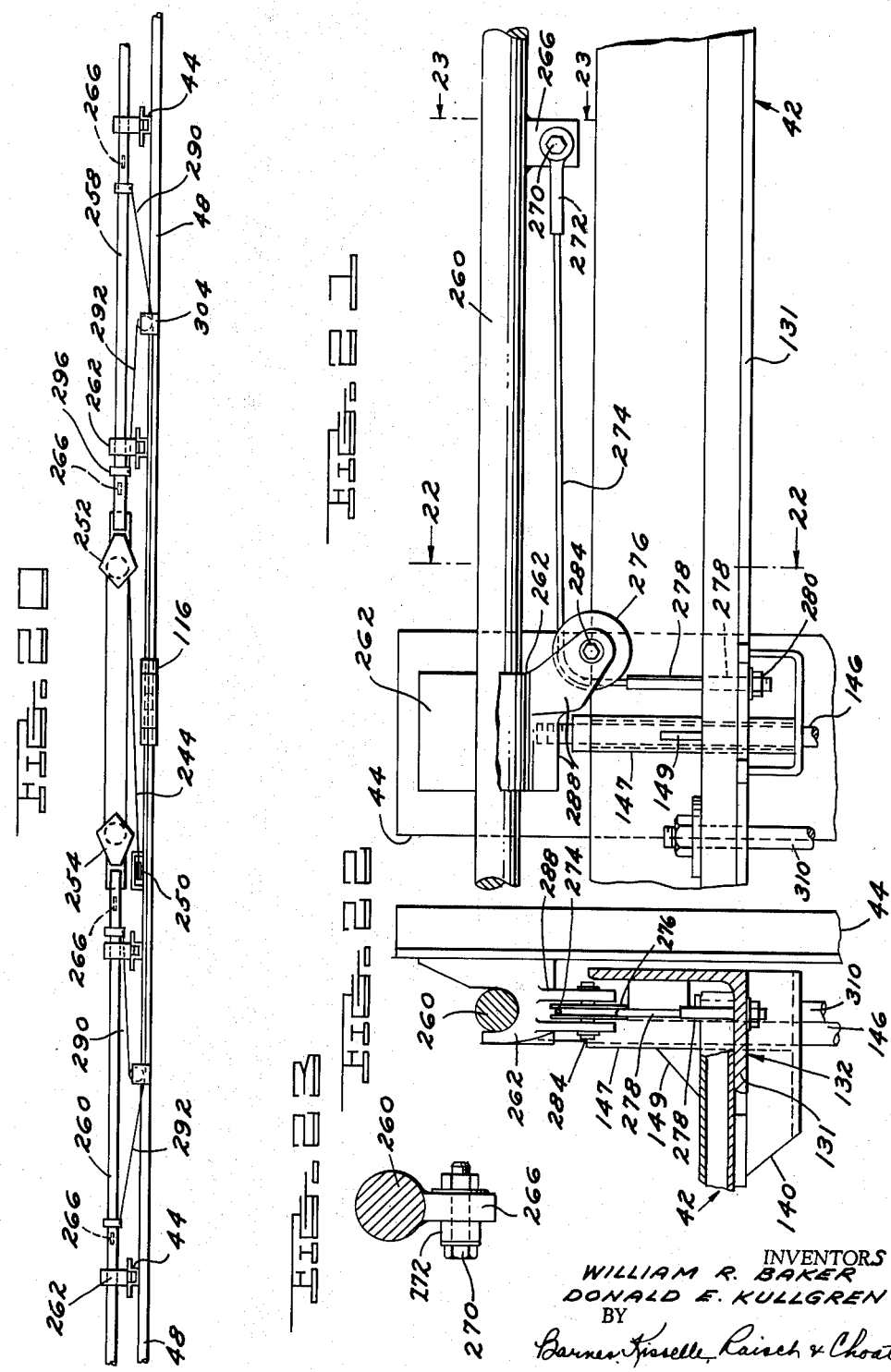

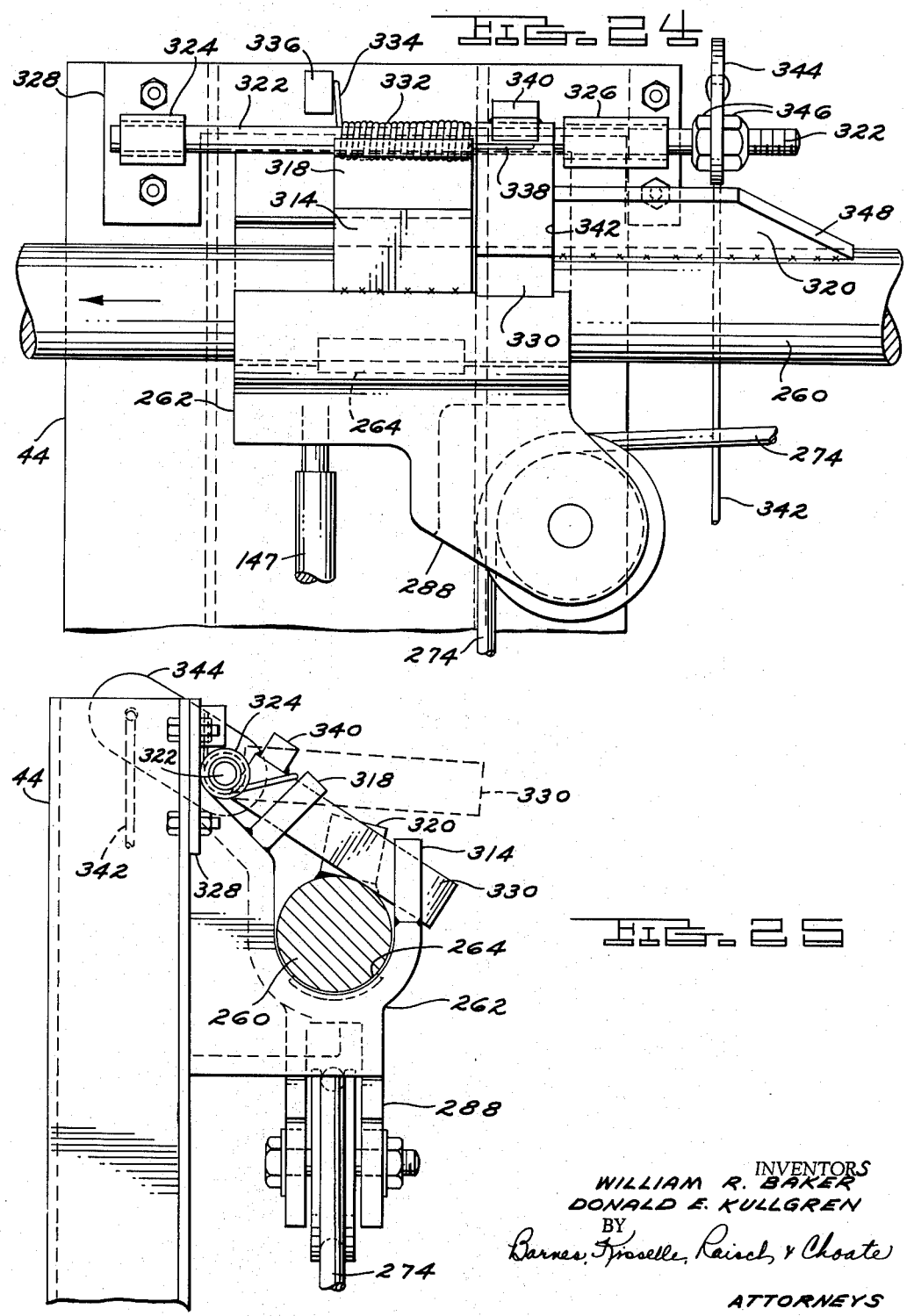

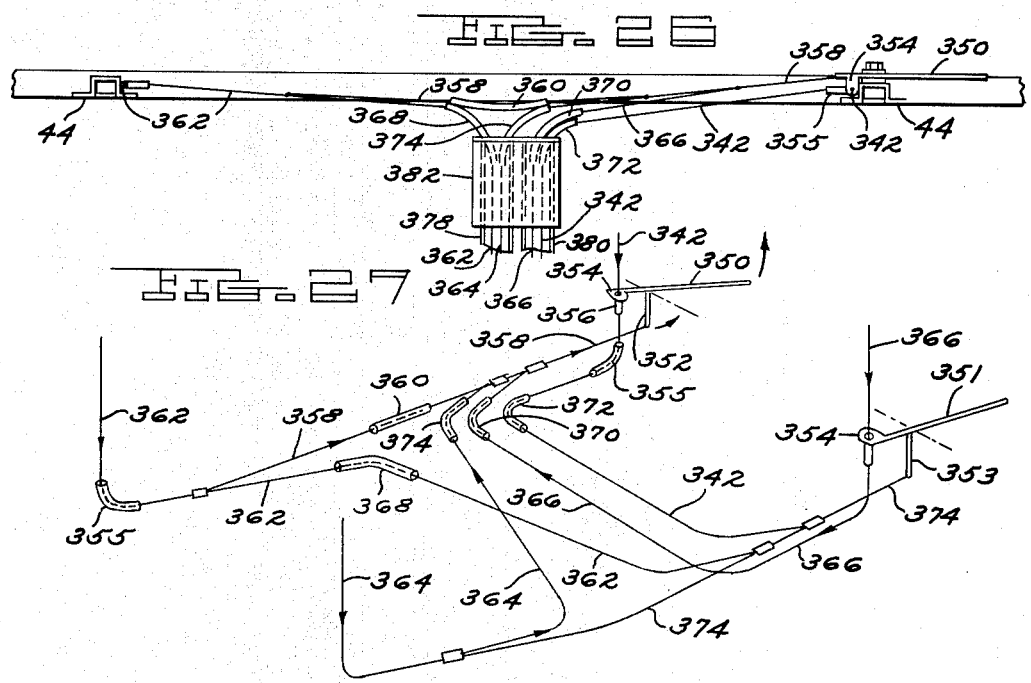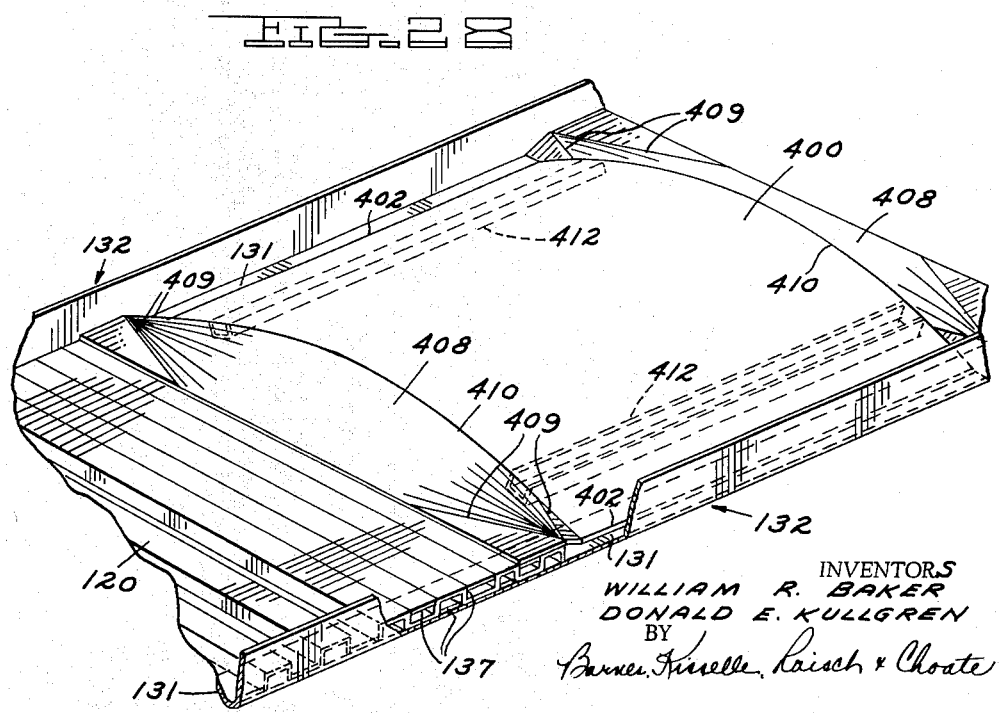
INVENTORS
WILLIAM R. BAKER
DONALD E. KULLGREN

United States Patent Office 3,221,669
Patented Dec. 7, 1965

3,221,669
APPARATUS FOR SHIPPING VEHICLES
William R. Baker, Detroit, and Donald E. Kullgren, Livonia, Mich., assignors to Paragon Bridge & Steel Co., Novi, Mich., a corporation of Michigan
Filed June 22, 1962, Ser. No. 204,412
28 Claims. (Cl. 105—368)

This invention relates generally to transportation of vehicles, and more particularly to a vehicle carrying shipping rack adapted to be mounted on a railway flat car to convert the same for shipment of automotive vehicles.

Fixed deck tri-level vehicle shipping racks adapted for mounting on extra-length, piggy-back railway flat cars have hitherto been provided which are capable of carrying twelve "standard size" or fifteen "compact size" American automobiles. The terminology "compact" and "standard" as used herein for illustrative purposes refers to the relative size designations generally employed for comparing such smaller 1962 automobiles as the Falcon or Corvair with such larger automobiles as the Ford Fairlane or Chevrolet Impala. When such automobiles are arranged horizontally in end-to-end relation on each deck of a fiexd deck rack, the overall height from the roof of the automobiles on the top deck to the top of the railroad track may range up to 19 feet. This load height exceeds the clearance limits of much of the railroad trackage in the eastern United States, particularly along the Atlantic seaboard. Hence eastern railroads have had to use bi-level shipping racks with reduced load carrying capacity, or they have resorted to more complicated rack designs wherein the automobiles are supported in various inclined, stacked arrangements rather than in their natural road traveling position.

It is an object of the present invention to provide an improved vehicle carrying shipping rack capable of transporting at least as many compact or standard size American automobiles as may be transported on equivalent size fixed deck shipping racks, but with an overall height when loaded and ready for travel which is within the height clearance limitations of eastern railroads.

Another object is to provide an improved vehicle shipping rack capable of carrying the above load and which can be loaded circus fashion by driving the automobiles along the decks lengthwise of the rack.

A further object is to provide an improved shipping rack of the above character in which all the automobiles are loaded on a flat deck and remain on a flat deck during shipment.

Still another object is to provide an improved shipping rack of the above character having a fixed bottom deck and one or two vertically movable upper decks which are easily raised and lowered even when fully loaded by improved hoisting mechanisms.

Still another object is to provide an improved shipping rack of the above character which is very strong and yet relatively simple in construction, and which may be loaded and unloaded with automobiles with a minimum of time and effort.

In the accompanying drawings:

FIG. 1 is an elevational view of a tri-level shipping rack construced in accordance with the present invention illustrating the rack mounted on a railroad flat car and loaded with 15 compact size automobiles with the middle and top decks of the rack in the raised, loading positions thereof.

FIG. 2 is an elevational view illustrating the shipping rack of FIG. 1 with the middle and top decks lowered to the shipping positions thereof.

FIG. 3 is a fragmentary sectional view taken on the line 3—3 of FIG. 5 illustrating the nesting of the automobiles when the middle and top decks are in their lowered, shipping positions of FIG. 2.

FIG. 4 is an elevational view of the shipping rack of FIGS. 1 and 2 illustrating how the rack may be loaded with 12 standard size automobiles.

FIG. 5 is a plan view of the shipping rack of FIG. 4.

FIG. 6 is an enlarged fragmentary elevational view of the central portion of the shipping rack indicated 6 in FIG. 2.

FIG. 7 is a fragmentary sectional view taken on the line 7—7 of FIG. 5.

FIG. 8 is a plan view of the central portion of the shipping rack shown in FIG. 6.

FIG. 9 is a fragmentary sectional view taken on the line 9—9 of FIG. 1.

FIG. 10 is a sectional view taken on the line 10—10 of FIG. 5.

FIG. 11 is a sectional view taken on the line 11—11 of FIG. 8.

FIG. 12 is a fragmentary sectional view taken on the line 12—12 of FIG. 2.

FIG. 13 is a fragmentary elevational view illustrating the connection of the shock absorber structure to the shipping rack and flat car.

FIG. 14 is a sectional view taken on the line 14—14 of FIG. 1.

FIG. 17 is a fragmentary elevational view of the portion of the rack indicated 6 in FIG. 2 but illustrating a modified form of deck hoisting mechanism also in accordance with the present invention.

FIG. 18 is a fragmentary diagrammatic view of the modified hoisting mechanism of FIG. 17.

FIG. 19 is a fragmentary sectional view taken on the line 19—19 of FIG. 17.

FIG. 20 is a fragmentary plan view of the modified deck hoisting mechanism shown in FIG. 17.

FIG. 21 is an enlarged fragmentary elevational view of a portion of the modified hoisting mechanism of FIGS. 17 and 20.

Figure 16:
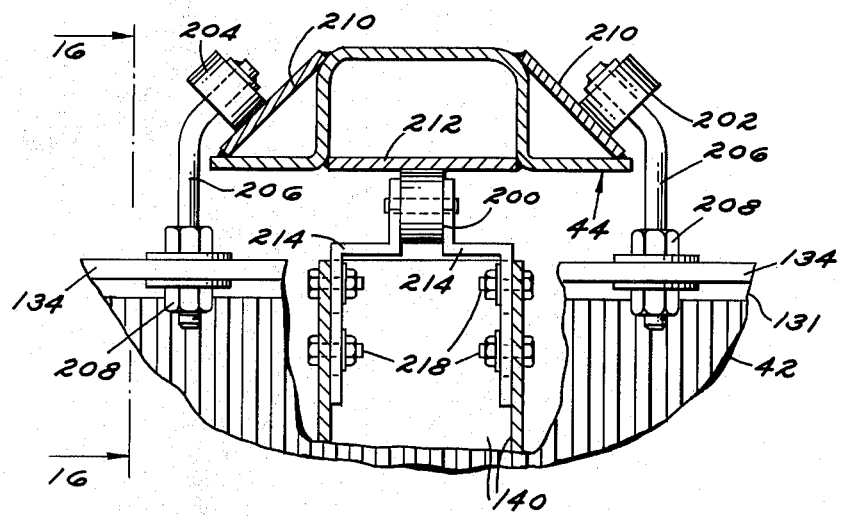
FIG. 16 is a fragmentary elevational view taken partially in section on the line 16—16 of FIG. 15.

FIGS. 22 and 23 are sectional views taken respectively on the lines 22—22 and 23—23 of FIG. 21.

FIGS. 24 and 25 are enlarged fragmentary side and end elevational views of a locking mechanism for the modified hoisting mechanism of FIG. 17.

FIGS. 26 and 27 are respectively a fragmentary plan view and a perspective diagrammatic view of a safety lock handle and lanyard cable system for operating the locking mechanism of FIGS. 24 and 25, FIGS. 26 and 27 being taken with the shipping rack turned around from the view of FIG. 17.

FIG. 28 is a fragmentary perspective view of a modified movable deck construction illustrating a transversely arched deck section for bridging the space between adjacent corrugated deck sections.

Referring in more detail to the accompanying drawings, a vehicle carrying shipping rack 30 constructed in accordance with the present invention is shown in FIG. 1 detachably mounted on the floor of a conventional extra-length or "piggy-back" railroad flat car 32. Shipping rack 30 is made in two substantially identical sections 34 and 36 to facilitate hoisting the assembled rack on and off the flat car. Each rack section 34, 36 comprises a tri-level super-structure including a fixed horizontal bottom deck 38 and vertically movable middle and upper decks 40 and 42 disposed substantially parallel with bottom deck 38. A series of upright columns 44 are provided along each side of the rack which are interconnected by horizontal channel beams 46 and 48 joined to the outer sides of columns 44 slightly above the raised, loading positions of top and middle decks 42 and 40. Triangular gusset plates 50 reinforce the connection of beams 46, 48 with columns 44 and stiffen the side structure of the rack against forces acting lengthwise of the flat car.

*Deck hoisting mechanism*

The middle and top decks 40 and 42 are raised to the loading position shown in FIG. 1 and lowered to the shipping position shown in FIG. 2 by a series of upright, parallel pivot beams 52 which are pivotally supported at the lower ends thereof adjacent the lower end of each upright column 44 for swinging movement in a vertical, longitudinal plane. The bottom end of each pivot beam 52 is pivotally supported by an axle pin 53 journalled in the sides of a U-shaped bracket 55 (FIG. 9) which is welded to upright column 44. The five pivot beams 52 along each side of each rack section are each pivotally connected near the upper ends thereof to a rigid horizontal linking beam 54 which insures that each of these series of five pivot beams 52 are maintained in parallelism and operate in unison.

As best shown in FIGS. 6 and 9 each pivot beam 52 has a pair of deck supporting rollers 56 and 58 journalled respectively on axle pins 60 and 62 secured to the pivot beam at the middle and upper end thereof. Rollers 56 and 58 run respectively in channel shaped guide tracks 64 and 66 welded to the undersides of middle and top decks 40 and 42. When pivot beams 52 are pivoted between the vertical and inclined positions thereof shown respectively in FIGS. 1 and 2, rollers 56 and 58 move the middle and top decks 40 and 42 vertically a distance equal to about ¼ of the horizontal movement of the rollers. Thus the pivot beams operate in the manner of toggle arms, providing about a four to one mechanical advantage for lifting the top deck, and twice this ratio for the middle deck, when pulled by a foce applied to the upper end of the pivot beams in the direction of movement thereof. This pivotal movement of pivot beams 52 also causes the top and middle decks 42 and 40 to move simultaneously. However, as best seen by comparing the deck positions in FIGS. 9 and 12, top deck 42 moves twice as far as middle deck 40 so that these decks are automatically adjusted as they are lowered to the cumulative saving in vertical clearance obtainable in tri-level rack 30.

Referring to FIGS. 6, 8 and 9, two identical jackscrew and chain mechanisms are provided for actuating pivot beams 52, one such mechanism being located on each side of the rack near the center thereof. Each jackscrew mechanism includes an upright channel beam 72 welded to the inner sides of horizontal channel beams 46 and 48 to provide support for a conventional electric gear motor drive mechanism 74. Drive mechanism 74 includes a thrust bearing 75 and electric motor 77 for respectively supporting and rotatably driving the bottom end of a helically threaded upright shaft 76 which is journalled at its upper end in journal bracket 78 secured to the upper end of channel 72. A cross arm 80 having a ball bearing nut mounted in the center thereof is threadably received on shaft 76 for travel axially therealong. The flanges of channel 72 prevent cross arm 80 from rotating, and thus rotation of shaft 76 drives cross arm 80 vertically between the solid and dotted positions thereof indicated in FIG. 6.

Cross arm 80 is coupled by a closed loop flexible element rigging arrangement (FIG. 6) to the two end pivot beams 52 located closest to the center of the rack so that all the pivot beams on one side of the rack are powered by the drive mechanism 74 on that side of the rack. Preferably the flexible element comprises a series of chains, including a chain 82 which is connected at one end to an eye bolt 84 secured to one end of cross arm 80. Chain 82 runs upwardly from bolt 84 over a sheave 86 and then to the left (as viewed in FIG. 6) and slightly downwardly to a coupling link 88. The opposite end of cross arm 80 is similarly connected to link 88 by a chain 90 which runs upwardly over a sheave 92 and then down to link 88. The five parallel arms 52 for rack section 34 are raised from the inclined to the vertical positions thereof by a chain 94 connected at one end to link 88 and at the other end to the near end of linking beam 54, chain 94 running over a sheave 96 journalled on the column 44 of rack section 34 closest to the center of the rack. These pivot arms 52 of rack section 34 are lowered from the vertical to the inclined position by a chain 98 connected at one end to the upper end of the center end pivot beam 52. Chain 98 runs from its connection with this pivot beam 52 over a sheave 102 supported on the longitudinally adjacent column 44, thence downwardly to a sheave 104, thence horizontally to a sheave 106 and finally upwardly to an eye bolt 100 secured to cross arm 80 beneath eye bolt 84.

The five pivot beams 52 of rack section 36 are also connected to cross arm 80 by a similar closed loop rigging arrangement. A chain 108 connected at one end to link eye 88 runs around a sheave 110 located immediately below sheave 96, and then back to and over a sheave 112, and then slightly downwardly to a connection with the horizontal linking beam 54 of rack section 36. Another chain 114, rigged symmetrically with chain 98, connects the upper end of the center end pivot beam 52 of rack section 36 with cross arm 80. Thus two closed loops, one for each bank of five pivot beams 52 on one side of each rack section, positively drive the pivot beams in either direction of movement.

The above rigging arrangement insures that all the pivot beams 52 on one side of the rack move in unison so that the decks 40 and 42 of each rack section move together and remain in horizontal alignment during vertical movement thereof. The two drive mechanisms 74, being electrically powered, are maintained in synchronism by employing common circuitry in a conventional manner. The helically threaded shafts 76 of the above hoisting mechanism provide a large ratio of mechanical advantage so that, when multiplied by the mechanical advantage provided by the pivot beams, it is only necessary to provide two drive mechanisms 74 per rack to lift a load which may range up to 25 tons.

Preferably the transversely opposite drive mechanisms 74 are located near the center of the rack and staggered longitudinally from one another, as shown in FIG. 8, although it is of course possible to depart from the illustrated arrangement without varying from the present invention. For example, the drive mechanisms 74 may be located near one end of the flat car and all the pivot beams near one end of the flat car may be connected in common and mounted to swing in the same direction. However, the central location of the hoisting mechanism is preferred since the chains thereof provide a flexible connection between rack sections 34 and 36. This allows the two rack sections 34, 36 to move toward and away from one another longitudinally of the flat car as the center of the flat car flexes up and down due to the long span between the wheel trucks of the flat car. The center ends of decks 40 and 42 of each rack section are spaced apart to accommodate such movement, and the center ends of beams 46 and 48 of each rack section are slidably joined to one another by sleeves 116 (FIGS. 6 and 8) which are welded at one end to one beam and butt at the other end against a stop plate 117.

*Construction of movable decks*

The construction of the middle and top decks 40 and 42 of the rack sections is best shown in FIGS. 5, 8 and 9–12. One feature of the middle and top decks is the provision of a series of spaced openings 118 (FIG. 5) of sufficient size to allow the top portions of the automobiles loaded on the deck therebeneath to "nest" or pass partially through the openings. Deck openings 118 may be formed by making the middle and upper decks 40 and 42 in six sections, three deck sections per rack section, and longitudinally spacing the deck sections from one another to provide five deck openings 118 therebetween of substantially the same size and spaced equally the length of the rack. Thus top deck 42 of rack section 34 includes three rectangular deck sections 120, 122 and 124, and similarly the top deck 42 of rack section 36 includes three rectangular deck sections 126, 128 and 130. The minimum longitudinal distance between adjacent deck sections is determined by the make and model of automobile having the longest body top, while the maximum longitudinal distance between adjacent deck sections is determined by the make and model of the automobile having the shortest wheel base.

It is to be understood that the particular shipping rack described herein is designed to be mounted on an 89′ flat car and to accommodate passenger automobiles, both standard size and compact size, having body contours of the symmetrical style prevelant in contemporary models of American manufacture wherein the highest portion of the body is general centered between lower front and rear decks. Automobiles of this type are designated "S" meaning standard size, and "C" meaning compact size. As illustrated in FIGS. 1 and 2, the two rack sections 34 and 36 when mounted end-to-end on an 89 foot flat car will together accommodate 15 compact size automobiles in parked horizontal positions with five compact automobiles on each level of the rack. The dimensions of such compact automobiles as the Falcon, Comet, Corvair and the standard size Ford and Chevrolet automobiles have been specifically considered in determining the aforementioned load carrying capacity of shipping rack 30, but variations in the design of rack 30 are of course permissible for other automobile loads without departing from the present invention.

It is to be noted that the deck sections of the top deck 42 are slightly offset longitudinally from the corresponding deck sections of middle deck 40. This offset ranges from about four to six inches and is illustrated in FIG. 3 on exaggerated scale. This offset accommodates a common characteristic of the body design of the aforementioned automobiles wherein the rear roof line of four-door sedans is located rearwardly of the forward edge of the rear tires of the automobile. Thus, in order to permit automobiles of this type to nest properly in the deck openings 118, the opening beneath a particular automobile is positioned slightly forward of the opening above this automobile.

When it is desired to load twelve standard size automobiles onto the same rack these larger automobiles are arranged as shown in FIG. 4. In this arrangement four standard size automobiles are parked on each deck rather than five compacts, and the load space above the opening between deck sections 126 and 128 on top deck 42 is either filled with a compact size automobile or left vacant. On the middle deck 40, the center load space is either filled with a compact or left vacant, and on the bottom deck the load space below the top deck opening 118 located between deck sections 122 and 124 is either filled with a compact or left vacant.

Each of the deck sections 120, 122, 124, 126 and 130 of the middle and top decks 40 and 42 are preferably made from a single metal plate, such as low carbon steel, and are shaped in a press brake so as to have relatively deep right angle corrugations extending transversely of the rack, as best shown in FIGS. 7 and 8. The corrugated deck sections are flat transversely of the rack and are welded at their side edges to the upper surface of a horizontal flange 131 of a right angle curb beam 132 (FIG. 12) which extends horizontally almost the full length of each rack section 34, 36. The vertical flange 134 of curb beam 132 provides an outer curb as well as reinforcement for the deck.

The deck sections 120 and 130 at the ends of the middle and top decks of the shipping rack may be longitudinally inclined by inserting a tapered riser pad 136 between curb flange 131 and the underside of the deck sections (FIG. 7). The inclination of the end deck sections provides suitable clearance for the automobiles at the ends of the rack when the railroad flat car 32 is of the drop center type having inclined floor plates at the ends thereof in order to permit vehicles to be driven over the draft gear of the flat car.

Each of the corrugated deck sections 120, 122, 124, 126, 128 are provided with a series of filler plates 137 (FIG. 7) which extend transversely between laterally opposite side columns 44. Plates 137 are welded between the vertical portions of the corrugated deck plate so as to be alternately flush with the top and bottom horizontal surfaces of the deck corrugations. Each corrugation thus closed with a filler plate 137 effectively forms a box section beam for laterally bracing the rack as well as for reinforcing the deck section.

Referring to FIGS. 9 and 12, the middle and top decks 40 and 42 are supported in the lowered shipping position by a series of inverted U-shaped angle brackets 138 which are welded to the inner sides of rack side columns 44. Another U-shaped footing member 140 is welded to the underside of curb beam flange 131 in vertical alignment with the deck supporting brackets 138, and a weight distributing pad 142 is welded between bracket 140 and the underside of the corrugated deck section. The middle and top decks 40 and 42 are held fixed against movement longitudinally and transversely of the rack by a series of vertical guide rods 144 and 146 respectively. Guide rods 144, 146 are secured at their upper ends by right angle brackets 148 welded to side columns 44, and are secured at the lower ends to deck supporting brackets 138. The deck sections and deck footing members 140 are provided with aligned holes for slidably receiving guide rods 144, 146 so that the middle and top decks can move vertically between the raised and lowered positions thereof illustrated in FIGS. 9 and 12 respectively. Preferably a guide sleeve 147 and a reinforcing gusset 149 (FIGS. 21 and 22) are also provided to prevent the movable decks from binding on guide rods 146 when the rack is subjected to lateral strains.

The shipping rack of the present invention may be loaded circus fashion by driving automobiles along the entire length of each of the decks due to the provision of a pair of wheel skids 150 for bridging each deck opening 118. Wheel skids 150 are laterally slidable between a loading position (FIGS. 5, 8 and 9, only one skid 150 being shown in FIG. 5), wherein the skids are in alignment with the wheels of the automobiles to form with the deck sections a continuous runway extending the length of the rack, and a shipping position (FIG. 12) wherein the skids 150 are disposed against the vertical curb flanges 134. When wheel skids 150 are in their shipping position, the inner sides 151 of each pair of transversely opposite skids are spaced sufficiently apart to permit the top portion of the automobile to be received for nesting therebetween when the middle and top decks are lowered to their respective shipping positions.

Wheel skids 150 are preferably generally U-shaped one-piece plates with upright side flanges 151 and 152 for guiding the automobile wheels. The wheel skids 150 are locked in place during shipment by a removable pin 154 (FIG. 12) which is inserted in an apertured plate 156 welded to curb beam flange 134. As shown in FIGS. 8 and 10, the opposite ends of each wheel skid 150 have a pair of L-shaped arms 158 welded to the bottom of the wheel skid and extending longitudinally beyond the transverse edge thereof. A pipe 160 is welded transversely between the outer ends of arms 158, pipe 160 being slidably received within a C-shaped channel guide 162 which is welded in the end corrugation of each deck section. An upright portion 164 of the end corrugation of the deck section serves to partially close off the open side of channel guide 162 so that pipe 160 is confined within channel guide 162. The inner ends of channel 162 are suitably sealed off so that the wheel skids 150 cannot come loose from their laterally slidable mounting in guides 162. The pair of wheel skids 150 which bridge the opening 118 at the center of the rack have a pair of straight arms 166 (FIGS. 8 and 11) which are slidably received in a square sleeve 168 welded to the tread surface of the wheel skid. Hence arms 166 can move relative to the wheel skids 150 to accommodate longitudinal flexing movement between the two rack sections 34, 36.

A sidewalk 167 (FIGS. 4, 8 and 10) comprising a rectangular, corrugated metal plate is provided along each side of each deck opening 118 to safeguard loading personnel when entering and leaving the parked automobiles on the middle and top decks. Sidewalks 167 are mounted below the level of wheel skids 150 so that they do not interfere with the lateral sliding movement thereof. Each sidewalk in the deck opening at the center of the rack (FIG. 8) comprises two pieces welded to the adjacent ends of horizontal rack beams 46, 48, while the remaining sidewalks are in one piece and are welded to the horizontal curb flange 131.

*Structure for mounting shipping rack on flat car*

Referring to FIGS. 1, 13 and 14, the shipping rack is secured to the flat car 32 by four shock absorber structures 170 of conventional construction, one of which is located on each side of each rack section. The horizontal side sill 172 of flat car 32 has secured thereon a wear pad 176 comprising a plate having a coined pocket in the upper side thereof in which a Teflon pad is glued. Pad 176 slidably supports an apron plate 178 which is welded to the bottom deck structure 38, and the housing 186 of shock absorber 170 is welded on apron 178. The side sill of the flat car also supports side columns 44 of the rack, further wear pads 176 being secured to the side sill beneath each side column. Another series of Teflon pads 180 are glued in pocketed plates welded to the floor of the flat car to provide further sliding support for the rack. The plunger sleeve 182 extending from each end of shock absorber 170 telescopes over a rod 183 (FIG. 14) extending from a bracket 184 (FIG. 13) which is welded to column 44, sleeve 182 abutting against bracket 184. The housing 186 of shock absorber 170 is thus affixed to the flat car while sleeves 182 move endwise relative to housing 186 with longitudinal movement of the rack to thereby compress the resilient shock absorbing structure within the housing. In addition to the shock absorber connection, the rack is further secured against lateral tipping movement by a series of clips 188 suitably secured to the rack, such as by welding them to the pivot arm brackets 70. Clips 188 are bent under a vertical flange 174 of the side sill but do not interfere with longitudinal sliding movement of the rack on the flat car.

*Operation*

The operation of the above described shipping rack 30 is relatively simple and foolproof. Assume that the rack is unloaded and the middle and top decks 40 and 42 thereof are in the raised loading position of FIG. 1. In this position the vertical clearances between the bottom, middle and top decks 38, 40 and 42 are sufficient to permit automobiles to be driven therebetween. The automobiles are driven up removable ramps (not shown) into one end of the rack and along the bottom, middle and top decks to parking positions with respect to the openings 118 formed by the spaced deck sections. Suitable gangplanks (not shown) are provided at the ends of each deck so that a series of flat cars each equipped with shipping racks 30 may be quickly loaded by using the well known circus or end loading technique wherein automobiles are driven through the shipping racks to load the remote flat car first. It is to be noted that during the loading operation the weight of the middle and top decks is carried by the pivot beams 52 which are secured in the vertical position due to the drive mechanisms 74 holding the pivot beams against the respectively adjacent side columns 44. During the loading operation wheel skids 150 are in the loading position illustrated in FIGS. 8 and 9 so that a continuous level runway extends from one end of the rack to the other. After each automobile is properly positioned with the front wheels thereof on one of the deck sections and the rear wheels on the next deck section, the wheel skids 150 are slid from beneath the automobile to their shipping position against the sides of the deck, and are locked in place wtih pins 154.

Each automobile is tied down in place by using four suitable holddown winches, preferably of the type disclosed in copending application Ser. No. 108,503 of Frank B. DePodesta, filed May 8, 1961 and assigned to the assignee herein. These holddown winches are slidably mounted on a pair of punched T-beams 190 (FIGS. 8, 9 and 11) which extend the length of each deck section between the wheel tracks of the deck. T-beams 190 are welded to the upper horizontal portions of the corrugated deck and also provide longitudinal reinforcement for the deck sections. The manner of tying down the automobiles is conventional and therefore not shown nor further described herein.

After all three decks of the rack have been fully loaded and the automobiles tied down, the electric gear motor drive mechanisms 74 are synchronously operated to rotate threaded shafts 76 to cause upward movement of cross arms 80, thereby causing pivot beams 52 to pivot from the vertical positions to the inclined, shipping positions thereof (FIG. 2). In the specific example of the rack disclosed herein, this pivotal movement of pivot beams 52 results in top deck 42 being lowered about 16 inches while the middle deck 40 is lowered about 8 inches. After the middle and top decks have been lowered to their shipping positions the top portions of the automobiles on the bottom and middle decks 38 and 40 extend through the corresponding openings 118 in the middle and upper decks 40 and 42 illustrated in FIGS. 3 and 12. Thus advantage is taken of the symmetrical body styles of present day automobiles to provide a shipping rack which when ready for travel has an overall height of, for example, less than 16′ 7″ when loaded with automobiles averaging between 54 and 55 inches in height.

It is to be noted that when the middle and top decks are in their shipping position, the weight of the decks is supported by brackets 138 rather than by pivot arms 52. If it is desired to position the middle and top decks in an intermediate shipping position this may be easily accomplished by inserting suitable shims between the column brackets 138 and deck footings 140. The middle and top decks are locked down in shipping position by the chain connection of the pivot beams 52 with the jackscrew drive mechanism. When so locked by the pivot beams as well as by the weight of the load, the middle and top decks 40 and 42 cooperate with guide rods 146 and brackets 138 to transversely brace the shipping rack.

The entire loading operation is achieved in a minimum of time due to the fact that the rack is capable of being circus loaded. When the loaded flat car reaches its destination, the automobiles may be quickly unloaded by reversing the loading procedure. The automobiles are both driven along the decks and shipped in their most favorable position, e.g., their natural horizontal road position. Since all the deck sections of each of the middle and top decks of each rack section are tied together by the deck curb beams 132, and since all the pivot beams 52 operate in unison, there is no necessity for individual alignment and adjustment of the various decks or deck sections. The deck construction is rugged and yet simple, thereby reducing the cost of manufacturing the rack.

A shipping rack constructed in accordance with the invention is capable of carrying a load of 15 compact cars, 12 standard size cars or various combinations of standard size and compact size automobiles up to a total of 15 of such automobiles, with an overall height within the permissible maximum load clearance of eastern railroads. This load capacity results in a considerable saving in shipping rates to the automobile shipper, and provides the eastern railroads with improved, economical equipment enabling them to more effectively compete for the automobile shipping business.

Modified movable deck guiding structure

Figure 15:
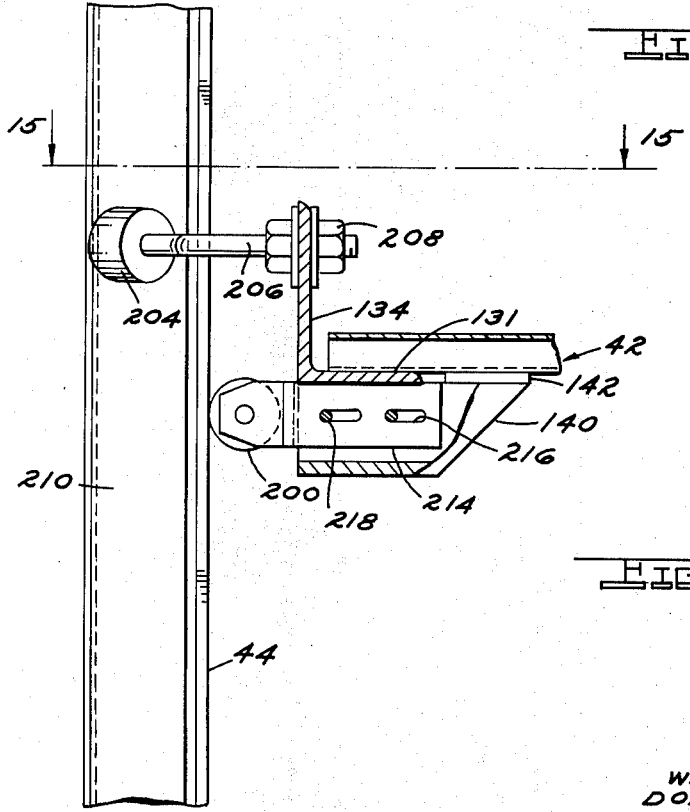
FIG. 15 is a sectional view taken on the line 15—15 of FIG. 16 and illustrating an alternative form of guide structure for the vertically movable middle and top decks of the shipping rack.

Referring to FIGS. 15 and 16, a modified form of deck guiding structure is shown which may be employed in place of, or in conjunction with, the vertical guide rods 146 described previously. In the modified guiding structure, three rollers 200, 202 and 204 are mounted on the sides of the middle and top decks 40 and 42 adjacent each side column 44 for rolling engagement with the side column during vertical movement of the middle and top decks. Rollers 202 and 204 are journalled on the angled ends of a pair of axle bolts 206, the opposite threaded ends of which are secured to the upright curb flange 134 by a pair of nuts 208. Rollers 202 and 204 are thus mounted for rotation about axes disposed at an angle of 45 degree to the longitudinal dimension of the rack and are positioned to track on a pair of filler plates 210 welded across the outside corners of the "hat section" side columns 44. The third roller 200 is mounted to track on a filter plate 212 welded across the inwardly facing center opening of column 44. The three rollers 200, 202 and 204 thus embrace the side column 44 and cooperate to hold the deck against movement in any direction in the plane of the deck. Roller 200 is journalled between a pair of arms 214 which are slotted at 216 to receive bolts 218 which adjustably secure arms 214 to the deck support footing 140. Roller 200 is thus located at an elevation below that of rollers 202, 204 and hence the three rollers also brace the deck against loads tending to produce lateral sagging. With the above modified roller guide structure the middle and top decks are guided for vertical movement with a minimum of frictional resistance to such movement.

Modified deck hoisting mechanism

A modified form of deck hoisting mechanism is shown in FIGS. 17-23 inclusive which may be used in place of the pivot beam and jackscrew hoisting mechanism previously disclosed herein. In the modified hoisting mechaanism, a pair of conventional winches 230 and 232 are mounted on platforms 234 which are connected to the lower deck 38 and which are slidably supported on the side sills of the flat car (FIGS. 17 and 19). Winches 230, 232 are mounted transversely opposite one another, and are reversed in position relative to one another on opposite sides of a common drive shaft 236 which extends transversely across the rack parallel to the rotational axes of the winch pinion gears 237. Shaft 236 is square in cross-section and is detachably connected, via a pair of square sleeves 237 secured to its ends, to the square inner ends of a pair of cylindrical stub shafts 239 journalled in brackets 241 secured to platform 234. A spur gear 238 is secured to shaft 239 for rotation therewith and drivingly engages the winch gear 237. The outer ends of shaft 239 are suitably shaped to receive the chunk of a portable air or electric motor or a hand wrench. Rotation of drive shafts 236, 239 drives winches 230, 232 in the same direction of rotation since they are mounted on opposite sides of the drive shaft. The reversed relationship of the winches permits one-man operation of the hoisting mechanism and also permits location of both winding drums 240 just inside the vertical side columns 44 of the rack (FIG. 19). Each shaft 239 is retained endwise in its supporting bracket 241 by a spring loaded keeper pin 243 which may be pulled upwardly to release shaft 239 for endwise removal thereof from sleeve 237 and bracket 241. Hence shaft 236 is quickly removable to permit loading and unloading of automobiles on the bottom deck 38 of the rack, shaft 236 being located so that it extends beneath the bumper of the parked automobiled adjacent thereto. This removability feature also reduces equipment cost since only one set of disconnectable shafts 236, 239 and one portable motor are required for operating a string of rack-equipped flat cars, the operating equipment being easily hand carried from car to car.

A pair of hoisting cables 242 and 244 are wound respectively on drums 240 of winches 230 and 232. The rigging of each of these cables on their respective sides of the rack is identical and hence only the rigging structure for cable 244 is described herein. As shown diagrammatically in FIG. 18, cable 244 runs from winch 232 to a fair lead pulley 246 which is pivoted for universal movement on a mounting bracket 248 secured to the bottom deck 38 of the rack. Cable 244 runs vertically upward from pulley 246 to a sheave 250 journalled on the inner side of rack beam 46 and then horizontally to a quadruple block 252. Block 252 and another quadruple block 254 are reaved together with their axes parallel by cable 244 in the manner illustrated and the working end of cable 244 is secured to a post 256 of block 252. It will be apparent that winding up cable 244 on winch 232 will result in blocks 252, 254 being pulled towards one another with a theoretical force multiplication of eight to one.

Blocks 252 and 254 are secured respectively to the ends of a pair of co-axially aligned hoisting rods 258 and 260 which in turn are slidably mounted respectively on rack sections 36 and 34. As shown in FIGS. 19, 21 and 22, rods 258, 260 are slidably supported by cast brackets 262 one of which is welded on the inner side of each column 44 adjacent the upper end thereof. Hoisting rods 258, 260 extend substantially the full length of each rack section 34, 36 and have a series of axially spaced vertical lugs 266 welded to the underside thereof (FIGS. 21 and 23) near each column 44. A bolt 270 connects a cable eye 272 to lug 266 and one end of a short length of cable 274 is secured to cable eye 272. Cable 274 runs from lug 266 over a sheave 276 to a cable sleeve 278 having a threaded end extending through a hole in curb beam 132 and adjustably secured thereto by a nut 280. Sheave 276 is journalled on an axle bolt 284 which is supported by a pair of dependent arms 288 of bracket 262. Bracket 262 also threadably receives the upper end of guide rods 144, 146 which function in the same manner as previously described.

It is to be understood that the above described structure of FIGS. 21, 22 is repeated at each rack side column 44 so that in the rack 30 of FIG. 1 there are six cables 274 connecting each hoisting rod 258, 260 with the corresponding side edge of upper deck 42. Thus winding up cables 242 and 244 causes each pair of rods 258 and 260 on each side of the shipping rack to move towards one another to thereby lift, via the connection of cables 274, the top deck 42 upwardly. Conversely, paying out cables 242 and 244 permits movement of rods 258, 260 away from one another so as to allow the top deck to drop vertically.

In order to insure that hoisting rods 258 and 260 move together and apart in unison, an equalizing rigging arrangement is provided as shown diagrammatically in FIG. 18. The equalizer arrangement comprises a pair of cables 290 and 292 which are secured respectively at one end by clamps 294 and 296 to hoisting rod 258, and at the other end by clamps 298 and 300 to hoisting rod 260. Equalizer cable 290 runs from clamp 294 substantially parallel to rod 258 to a sheave 302 of a double pulley 304 mounted on rack beam 46 (FIGS. 17 and 20), and then continues parallel to rods 258 and 260 to a sheave 306 of another double pulley block 308 mounted on beam 46 adjacent hoisting pipe 260. Cable 290 runs around sheave 306 and back towards rod 258 substantially parallel to rod 260 to a connection with clamp 298 adjacent block 254.

As rod 260 moves axially towards rod 258 it exerts a pull on cable 290 which is transmitted via sheaves 306 and 302 and clamp 294 to rod 258 so that it must move an equal distance towards rod 260. Equalizer cable 292 is rigged symmetrically with cable 290 and likewise causes, upon axial movement of rod 258 towards rod 260, rod 260 to move an equal distance towards rod 258. The equalizer cables also cause equal movement of rods 258, 260 whenever they are moved axially away from one another. Thus the above equalizer rigging arrangement insures that the upper decks 42 of each rack section 34, 36 move in unison and do not become misaligned horizontally.

Referring to FIG. 19, the top deck 42 is connected to the middle deck 40 by a series of vertical lift rods 310 which extend through openings provided in the side edges of the deck sections. A washer 312 is secured to the lower end of lift rod 310 by a nut 314, washer 312 being spaced a predetermined distance such as 8″ beneath the undersurface of middle deck 40 when both the middle and top decks 40 and 42 have been lowered to their shipping position. During the first 8″ of upward movement of top deck 42 the middle deck 40 remains stationary on its support brackets 138. During the second 8″ of upward movement of top deck 42, the middle deck is lifted by rods 310 along with top deck 42. Hence by the time the top deck is fully raised the vertical spacing between the middle and top decks 40 and 42 will be increased by the same amount as the increase in spacing between the middle and bottom decks 40 and 38. The above distances are merely exemplary and may be adjusted to give more or less vertical loading clearance between the decks as required for the height of the particular vehicles being shipped on the rack.

The modified deck hoisting mechanism described above is economical in construction and, due to the equalizer cable arrangement only one block and tackle arrangement comprising blocks 252 and 254 is required for each pair of hoisting rods 258, 260. The provision of rods 258, 260 is advantageous in that it provides a very strong and substantially non-elastic connection between the blocks 252, 254 and the upper decks 42 of the two rack sections 34, 36. Since only short and equal lengths of cable 274 are used to connect the rods 258, 260 with upper deck 42 the problem of cable stretching is eliminated. Connecting a series of cables 274 to the rods by means of lugs 266 and to beam 132 by nuts 280 is less expensive than splicing a network of cables and in addition provides for adjustability to facilitate assembly and re-adjustment to compensate for normal wear in use.

It is to be understood that various components of the above-described modified hoisting mechanism may be altered, if desired, without departing from the broader aspects of the present invention. For example, short lengths of link chains may be substituted for the cables 274. Experience has shown that, if chains are to be used in lieu of cables, high quality precision link chains should be employed for optimum performance. Also, other forms of the rigid elements comprising hoisting rods 258 and 260 may be employed, such as hollow pipe or a suitable type of beam such as a channel. While the above-described winch and block-and-tackle arrangement is preferred due to its simplicity and relatively low cost, other power operating means such as the previously described jack-screw and chain mechanism or a hydraulic cylinder and piston power unit may be provided for pulling, via a direct chain and pulley connection, the rigid hoisting elements 258, 260 towards one another.

The modified hoisting mechanism is automatically locked when the middle and upper decks 40 and 42 have been raised to their loading position by means of a latch assembly shown in FIGS. 24 and 25. One of these latch assemblies is mounted on the inner side and near the upper end of each of the four columns 44 at the adjacent ends of rack sections 34 and 36. The latch assembly comprises the previously described bracket 262 which is modified by welding an upright stop 314 and an inclined stop 318 to the upper surfaces of bracket 262 on opposite sides of rod 260. Another stop 320 is welded on the upper surface of rod 260 and is positioned to pass between stops 314, 318 during axial movement of rod 260 as the decks are raised and lowered. A rod 322 is journalled in a pair of bushings 324 and 326 which are welded to a spacer plate 328 which in turn is bolted to column 44. A latch tongue 330 is welded to rod 322 and extends radially therefrom adjacent one side of stops 314, 318 and terminates beyond stop 314. Tongue 330 is biased to its locked position shown in solid lines in FIGS. 24 and 25 by a spring 332 which is wound around rod 322. One end 334 of the spring is retained by a lug 336 and the other end 338 of the spring is hooked over the upper side of tongue 330 and retained by lug 340. The weight of the decks tends to pull rod 260 in the direction of the arrow of FIG. 24, and such movement is prevented by the vertical edge 342 of stop 320 butting against tongue 330 which in turn is held against stops 314, 318.

When it is desired to lower the decks from their raised position, rod 260 is unlocked by pulling downwardly on a lanyard 342 the upper end of which is connected to a pivot arm 344 affixed to the threaded end of rod 322 by nuts 346. This rotates rod 322 against the pressure of spring 332, thereby raising tongue 330 to the unlocked position illustrated in broken lines in FIG. 25 wherein the tongue clears stop 320. Rod 260 is then free to move in the direction of the arrow, and once stop 320 has moved beneath tongue 330 the lanyard may be released. During return movement of rod 260 as the decks are being raised, the inclined edge 348 of stop 320 engages tongue 330 and cams it up so that stop 320 can pass therebeneath. As soon as edge 342 of stop 320 moves past tongue 330 the tongue is automatically forced to its locked position by spring 332.

A lanyard cable operating system is provided as shown in FIGS. 17, 26 and 27 which permits simultaneous one-man operation of all four of the above-described latching assemblies from a point convenient to the hoisting winches 230, 232. This system includes a pair of independently operated levers 350 and 351 fulcrumed respectively on transversely opposite side columns 44 adjacent the winches and normally positioned as shown in FIG. 17 when the latch assemblies are in locked condition. Levers 350, 351 each have a short arm 352, 353 extending perpendicularly from the fulcrum pivot in the plane of rotation of the levers. Lanyard 342 extends downwardly from the latch assembly, slidably through a hole in a lateral ear 354 at the short end of lever 350 and then slidably through a bent tube 355 (FIGS. 17 and 26) which is welded to column 44 and serves as a sheave for guiding the lanyard. A stop 356 is affixed to lanyard 342 beneath ear 354. When lever 350 is rotated in a clockwise direction as viewed in FIG. 17, or counterclockwise as viewed in FIG. 27, lanyard 342 is pulled downwardly, thereby raising tongue 330 of the latch assembly and unlocking hoisting rod 260.

Operating lever 350 to pull lanyard 342 downwardly also simultaneuosly unlocks the other three latch assemblies due to provision of an interconnecting cable arrangement. As shown in plan in FIG. 26 and diagrammatically in FIG. 27, a cable 358 is connected to the lower end of arm 352 and extends along the side of the rack and slidably through a guide tube 360 to a connection with another lanyard 362 which in turn is connected, in the manner of lanyard 342, to the other latch assembly on the same side of the rack. The two lanyards 364 and 366 for the pair of latches on the other side of the rack extend downwardly therefrom through guide tubes (not shown) similar to tube 355, then generally horizontally along the side of the rack towards one another and slidably through another pair of tubes (not shown) corresponding to tubes 368 and 370. These tubes are secured to the bottom deck of the rack at each side thereof so as to guide lanyards 364, 366 transversely across the rack beneath the bottom deck and thence to respective connections with cable 358. A pair of bottom deck bracing channels 378, 380 (FIG. 26) also guide the cables as they cross the bottom deck, and a plate 382 is welded on top of the channels to provide a wheel track bridge over the cables. Hence, as indicated by the arrows on the aforementioned cables and lanyards in FIG. 27, pivoting the handle end of lever 350 upwardly rotates arm 352 and thus draws cable 358 towards lever 350, which in turn pulls lanyards 362, 364 and 366 downwardly. The other lever 351 is connected in like manner via a cable 374 to lanyards 342, 362 and 364, suitably guided as by tubes 355, 360, 368, 372, so as to pull lanyards 342, 362 and 364 downwardly when lever 351 is pivoted to pull lanyard 366 downwardly. The latch springs 332 of the latch assemblies provide sufficient tension to draw the lanyards 342, 362, 364 and 366 upwardly when levers 350, 351 are released. Thus, like the winches 230, 232, unlocking of the hoisting rods 258, 260 may be controlled by one man from either side of the rack.

*Modified deck construction*

The foregoing shipping rack may be further modified in accordance with the invention by the provision of transversely arched deck sections 400 (FIGS. 17, 19 and 28) at each of the openings 118 between the flat corrugated deck sections 120, 122, 124, 126, 128 and 130 of middle and upper decks 40 and 42. The arched deck sections 400 comprise smooth steel plates which are the same dimension transversely of the rack as the corrugated deck sections 120 etc., and are welded at the outer edges 402 thereof onto the horizontal curb beam flange 131. At the center of the rack the deck curb beams 132 of the two rack sections 34 and 36 are extended longitudinally towards one another (FIG. 17) to support a pair of arched deck sections 404, 406 for covering the center opening 118 of the rack. A rectangular plate 408, bent along lines 409 as shown in FIG. 28 is welded between each transverse edge 410 of arched sections 400, 404, 406 and the adjacent flat deck sections 120, 122, etc. to provide a transition wheel track and cover therebetween as well as a transverse brace for the arched sections. A pair of channels 412 are welded to the underside of arched sections 400, 404, 406 to provide longitudinal bracing therefor, channels 402 being positioned sufficiently close to side edges 402 to permit the roof of an automobile to nest between the channels. Additional transverse braces 414 are welded near the adjacent edges of the center bay sections 404, 406 (FIG. 17), and a flexible cover, comprising a heavy rubber pad 416 clamped at its lateral edges between metal strips 417, is also secured to the adjacent edges to serve as an expansible seal therebetween.

The arched deck sections 400, 404, 406 may be used in place of wheel skids 150 to provide a bridge over the deck openings 118 for supporting the wheels of the automobiles being driven along the deck. In addition, the arched deck sections cover the openings so that rusty water or grease does not drip onto the automobiles positioned therebelow. It is to be understood that the wheels of the automobiles when in shipping position rest on the flat deck sections 120, etc. just as they do when the wheel skids 150 are provided on the rack. The radius of the transverse arch of deck sections 400, 404, 406 is sufficient to accommodate the similarly curved roof of the automobiles positioned therebelow so that a substantial reduction in the overall loaded height of the rack is obtained by lowering decks 40 and 42 to the shipping position as in the previous embodiment.

We claim:

1. In combination, a railroad flatcar, a multi-level shipping rack for supporting wheeled vehicles on said railroad flatcar comprising a bottom deck extending generally horizontally lengthwise of said flatcar and adapted to support a line of wheeled vehicles with the highest body portions thereof located in predetermined shipping positions therealong, upright frame means disposed along each longitudinal side of said bottom deck, an upper deck spaced above said bottom deck and extending generally horizontally lengthwise of said flatcar between said upright frame means for supporting a line of wheeled vehicles therealong, said upper deck comprising a series of spaced deck sections movable as a unit and adapted to support the wheeled vehicles positioned for shipment on the upper deck, said deck sections being spaced longitudinally to provide a plurality of clearance spaces adapted to individually receive the highest body portions of the bottom deck vehicles when disposed in said shipping positions, a parallel series of beams pivotally mounted at spaced intervals along each longitudinal side of said bottom deck of said rack for movement in a vertical longitudinal plane between an upright position and an inclined position, said beams each having a roller journalled thereon adapted to support said upper deck by rolling contact therewith, means for pivoting said beams in unison between the upright and inclined positions thereof for raising and lowering said upper deck between a raised loading position wherein said upper deck is spaced sufficiently above the bottom deck to permit the vehicles to be driven therealong and a lowered shipping position wherein the highest body portions of the vehicles on the bottom deck individually project into the corresponding clearance space between said deck sections of said upper deck and means on said upright frame members for supporting said upper deck in said lowered shipping position thereof.

2. The combination set forth in claim 1 wherein said beam pivoting means includes rigid linking means interconnecting said beams in each of said parallel series of said beams near the upper ends thereof for maintaining said series of beams in parallelism during pivotal movement thereof and flexible means rigged for exerting an endwise force on said rigid linking means to thereby pivot said beams.

3. The combination set forth in claim 1 wherein said rack includes a third deck spaced above said upper deck and extending lengthwise of the rack for receiving a further line of wheeled vehicles in predetermined shipping positions, said third deck comprising a series of deck sections similar to said upper deck adapted to support the vehicles positioned for shipment on the third deck and spaced to provide clearance spaces to permit nesting of the highest body portions of the upper deck vehicles, said beams each having a second roller journalled thereon adapted to support said third deck by rolling contact therewith whereby said upper and third decks are simultaneously moved vertically between a lowered shipping position and a raised loading position by said pivotal movement of said beams, and including means on said upright frame members for supporting said third deck in said lowered shipping position thereof.

4. The combination set forth in claim 1 wherein said beam pivoting means includes a threaded shaft rotatably mounted on said rack, means for rotating said shaft, a cross member threadably received on said shaft, means for holding said cross member against rotation relative to said shaft so that rotation of said shaft propels said cross member axially along said shaft and means connecting said cross member to said beams so that the movement of said cross member in response to rotation of said shaft is transmitted via said connecting means to said beams substantially in the direction of pivotal movement thereof for pivoting the beams.

5. The combination set forth in claim 4 wherein said connecting means includes rigging means and a flexible element rigged thereon to connect said cross member with said beams in a closed loop rigging arrangement so that travel of said cross member in one direction pulls said beams from the inclined to the upright position thereof and travel in the opposite direction pulls said beams from the upright to the inclined position thereof.

6. In combination, a railroad flatcar, a multi-level shipping rack for supporting wheeled vehicles on said railroad flatcar comprising a bottom deck extending generally horizontally lengthwise of said flatcar and adapted to support a line of wheeled vehicles with the highest body portions thereof located in predetermined shipping positions therealong, upright frame means disposed along each longitudinal side of said bottom deck, an upper deck spaced above said bottom deck and extending generally horizontally lengthwise of said flatcar between said upright frame means for supporting a line of wheeled vehicles therealong, said upper deck comprising a series of spaced deck sections movable as a unit and adapted to support the wheeled vehicles positioned for shipment on the upper deck, said deck sections being spaced longitudinally to provide a plurality of clearance spaces adapted to individually receive the highest body portions of the bottom deck vehicles when disposed in said shipping positions, and means operably connected to said frame means for supporting and vertically moving said upper deck between a raised loading position wherein said upper deck is spaced sufficiently above the bottom deck to permit the vehicles to be driven therealong and a lowered shipping position wherein the highest body portions of the vehicles on the bottom deck individually project into the corresponding clearance spaces between said deck sections of said upper deck, said upper deck supporting and moving means comprising a pair of connector elements one extending along each side of said rack and supported by said upright frame means above the raised position of said upper deck for movement in a direction substantially parallel to the longitudinal side edges thereof, a plurality of rotatable members journalled on said upright frame means at spaced intervals adjacent said connector elements, a plurality of flexible elements individually connected to said connector elements at spaced intervals therealong, each of said flexible elements running in the same direction substantially parallel to the associated connector element to and over the corresponding one of said rotatable members and thence downwardly to a connection with said upper deck, and means for simultaneously moving said pair of connector elements axially in the same direction for raising and lowering said upper deck, said connector elements having higher resistance to elastic deformation resulting from tensile stress in the direction of their movement than said flexible elements, said rack including an intermediate deck of substantially the same construction as said upper deck interposed between said bottom deck and said upper deck, said intermediate deck extending longitudinally of the rack substantially parallel to said upper deck for receiving a line of automobiles in a predetermined shipping arrangement, a plurality of lifting elements, one associated with each vertical run of said flexible elements, extending vertically between said upper and intermediate decks, said lifting elements being slidably connected to one of said upper and intermediate decks and being operably connected for movement with the other of said upper and intermediate decks to provide a lost motion connection therebetween so that said intermediate deck is lifted during the upper portion of vertical travel of said upper deck, and means on said upright frame means for supporting said upper and intermediate decks in their respective lowered shipping positions.

7. The combination set forth in claim 6 wherein said lifting elements comprise rigid members disposed at longitudinally spaced intervals along the longitudinal edges of said upper and intermediate decks, said members having means connected thereto spaced from the side of said one deck remote from said other deck for engaging said one deck during the upper portion of vertical travel of said upper deck.

8. In a shipping rack having generally horizontal bottom, second and third decks spaced vertically from one another, the second and third decks being vertically movable, and having means for guiding vertical movement of the second and third decks while preventing horizontal movement thereof, the combination therewith of a hoisting mechanism for supporting said second and third decks comprising a parallel series of beams pivotally mounted at spaced intervals along each longitudinal side of the bottom deck of the rack for movement in a vertical plane longitudinally of the rack between an upright position and an inclined position, said beams each having first and second rollers journalled thereon respectively adjacent the second and third decks in positions for rolling supporting contact with such decks during pivotal movement of said beams between said positions, means connected to said beams for pivoting said beams in unison between said positions thereof to thereby raise and lower the second and third decks and means for supporting said second and third decks at their respective lower limits of vertical travel.

9. In a shipping rack having generally horizontal bottom, second and third decks spaced vertically from one another, means for supporting said decks so that the second and third decks are vertically movable, and having means for guiding vertical movement of the second and third decks while preventing horizontal movement thereof, the combination therewith of a hoisting mechanism for said second and third decks comprising a pair of connector elements one extending along each side of the rack and supported independently of the third deck for movement thereabove in a direction substantially parallel to the longitudinal side edges thereof, a plurality of flexible elements individually connected to said connector elements at spaced intervals therealong and running therefrom in the same direction to a connection with said third deck, said connector elements having higher resistance to elastic deformation resulting from tensile stress in the direction of their movement than said flexible elements, means supported on said rack for guiding each of said flexible elements such that it runs from said connector element over said means and thence downwardly to its connection with said third deck, means for simultaneously moving said pair of connector elements in the same direction longitudinally of the rack for raising and lowering said third deck and means providing a lost motion connection between said second and third decks such that the second deck is lifted by the third deck during the upper portion of the vertical travel of the third deck, said deck supporting means including means for supporting said second and third decks at their respective lower limits of vertical travel.

10. The combination set forth in claim 9 wherein said flexible elements are equal and relatively short in length compared to the length of said connector elements and said guiding means for said flexible elements comprise rotatable members journalled on said rack slightly below said respective connector elements.

11. The combination set forth in claim 10 wherein each of said flexible elements has a threaded connector secured thereto and disposed below said third deck to permit adjustment of the suspension of said third deck from said connector elements.

12. The combination set forth in claim 9 wherein said rack includes upright columns spaced longitudinally along the sides thereof and extending upwardly beyond said third deck and means affixed to said columns above the raised position of said third deck adapted to support said connector elements for movement longitudinally of said rack.

13. The combination set forth in claim 9 wherein each of said connector elements comprises a rod and said support means comprises a bracket at each of said columns having an anti-friction plastic pad secured thereto and adapted for slidably supporting said rods thereon.

14. The combination set forth in claim 9 wherein said means for simultaneously moving said connector elements comprises a pair of winches mounted in reversed relationship and transversely opposite one another at the sides of the bottom deck of said rack, said winches each having a winding drum disposed inwardly of said respective winches, a pair of flexible elements respectively interconnecting the winding drums and the connector elements on the same side of the rack for moving said connector elements axially in response to rotation of the winding drums, said winches each having a driven gear with one of said gears being rotatable about an axis parallel to and spaced longitudinally from the rotational axis of the other of said driven gears, a drive shaft extendnig transversely across said rack and being removably journalled above said bottom deck for rotation about an axis disposed parallel to and between said rotational axes of said winch driven gears, said drive shaft having a pair of gears mounted thereon for rotation therewith each engaging one of said winch driven gears so that rotation of said drive shaft causes synchronous rotation of said winch winding drums in the same direction of rotation.

15. The combination set forth in claim 9 wherein said rack comprises two substantially identical rack sections adapted to be mounted end-to-end on a flat car each of which includes a pair of said connector elements mounted above the upper deck of the respective rack section, said connector elements on the same side of said rack sections being substantially aligned with one another and disposed with the adjacent ends thereof spaced apart, said means for moving said connector elements comprising flexible means on each side of the rack operably connected to the adjacent ends of the aligned connector elements to exert endwise forces thereon tending to draw said connector elements towards one another, and drive means mounted on said rack operably connected to said flexible means for moving said flexible means to raise and lower said upper deck.

16. The combination set forth in claim 15 including equalizer rigging means on each side of said rack for said connector elements disposed on the same side of the rack, each such rigging means comprising first and second sheaves journalled on said frame means respectively adjacent said aligned connector elements, a first flexible element connected to one of said aligned connector elements and running substantially parallel thereto away from the other of the aligned connector elements to and around said first sheave and thence back to a connection with said other connector element and a second flexible element connected to said other connector element and running substantially parallel thereto away from said one connector element to and around said second sheave and thence back to a connection with said one connector element to thereby insure equal simultaneous movement of said aligned connector elements towards and away from one another.

17. In a vehicle shipping rack having generally horizontal and longitudinally extending bottom and upper decks spaced vertically from one another and means for so supporting said decks, the combination therewith of a pair of connector elements one extending along each side of the rack, means mounted on said rack for supporting said connector elements independently of said upper deck for movement thereabove in a direction substantially parallel to the longitudinal side edges thereof, a plurality of flexible elements each having one end thereof connected to said connector elements at spaced intervals therealong and having the other end thereof connected to said upper deck at spaced intervals therealong, means supported on said rack for guiding each of said flexible elements such that it runs from said one end thereof over said means and thence downwardly to its connection with said upper deck, means for simultaneously moving said pair of connector elements in the same direction longitudinally of the rack for raising and lowering said upper deck, means for guiding vertical movement of said upper deck while preventing horizontal movement thereof, and means interconnecting said connector elements and the sides of the rack for releasably locking each of said connector elements in a fixed position corresponding to a raised position of said upper deck.

18. The combination set forth in claim 17 wherein said locking means comprises a stop affixed to said connector element for movement therewith, a latch movably mounted on said rack and normally disposed in the path of movement of said stop for engagement therewith to hold said connector element in said fixed position, and means operably connected to said latch for moving the same out of engagement with said stop to release said connector element, said stop having a camming surface adapted to shift said latch out of the way of said stop during movement of said connector element towards said fixed position.

19. The combination set forth in claim 17 wherein said locking means includes a pair of latch mechanisms mounted on said rack one adjacent each of said connector elements, each latch mechanism having a movable member adapted to releasably interlock with the connector element associated therewith, a pair of operating levers fulcrumed one on each side of said rack below the respective latch mechanisms, a pair of lanyards operably connected one to each of said movable members and running downwardly past the lever disposed therebelow and thence across said bottom deck to a fixed connection with the other lever, said levers having a one-way connection with the portion of the lanyards running therepast such that rotation of either one of said levers is operable to pull both of said lanyards downwardly to thereby operate both latch mechanisms.

20. A multi-level shipping rack including in combination a first deck extending lengthwise thereof for receiving vehicles for shipment thereon, a plurality of upright columns positioned along the longitudinal side edges of the first deck and spaced transversely apart for receiving the vehicles therebetween, means for longitudinally bracing said upright columns, a second deck spaced above the first deck and extending lengthwise of the rack between said columns for receiving vehicles for shipment thereon, means operably connected to said upright columns for hoisting said second deck vertically between a raised loading position and a lowered shipping position, and means operably connecting said second deck with said columns for guiding vertical movement of said second deck and preventing horizontal movement of said second deck relative to said columns, said last-mentioned means comprising a plurality of rigidly interconnected rollers connected to said second deck and positioned outwardly of the side edges thereof adjacent each of said columns, at least two of said rollers being vertically spaced from one another and arranged to vertically track on said column and at least two of said rollers being separated by said column to thereby support said second deck against horizontal and bending stresses.

21. A multi-level shipping rack including in combination a first deck extending lengthwise thereof for receiving vehicles for shipment thereon, a plurality of upright columns positioned along the longitudinal side edges of the first deck and spaced transversely apart for receiving the vehicles therebetween, means for longitudinally bracing said upright columns, a second deck spaced above the first deck and extending lengthwise of the rack between said columns for receiving vehicles for shipment thereon, means operably connected to said upright columns for hoisting said second deck vertically between a raised loading position and a lowered shipping position, and means operably connecting said second deck with said columns for guiding vertical movement of said second deck and preventing horizontal movement of said second deck relative to said columns, said last-mentioned means comprising a set of first, second and third rollers adapted to track on one of said upright columns, said upright column having vertically extending tracking surfaces comprising a first surface on the inner side thereof disposed parallel with the longitudinal side of said upper deck and second and third surfaces on the outer side thereof lying in planes disposed respectively at acute angles with the plane of said first tracking surface and intersecting with one another outwardly thereof, axle means secured to the longitudinal side edge of said second deck adjacent said one column, said first roller being journalled on said axle means for rolling contact with said first tracking surface, said second and third rollers being journalled on said axle means for rolling contact with said second and third surfaces respectively.

22. The combination set forth in claim 21 wherein said first roller is located at an elevation spaced vertically below the elevation of said second and third rollers.

23. In combination, a railroad flatcar, a multi-level shipping rack for supporting wheeled vehicles on said flatcar comprising bottom, middle and top decks, a pair of upright side frames, each of said decks extending transversely between said side frames and generally horizontally lengthwise of said flatcar and each adapted to support a line of wheeled vehicles with the highest body portions thereof located in predetermined shipping positions therealong, said side frames being disposed along each longitudinal side of said decks, means on said side frames for supporting said decks in vertically spaced relation at predetermined shipping elevations, said middle and top decks each being movable vertically as a unit while supporting the wheeled vehicles positioned for shipment on the respective decks, means interconnecting said middle and top decks respectively with said side frames for guiding vertical movement and preventing horizontal movement of said top and middle decks relative to said frames, said middle and top decks each having a plurality of clearance spaces adapted to individually receive the highest body portions of the bottom and middle deck vehicles when the vehicles are disposed in said shipping positions and said middle and top decks are disposed at said shipping elevations, means operably connected to said frames for supporting and vertically moving said top deck between its shipping elevation and first and second higher loading elevations wherein said top is spaced sufficiently above the middle deck to permit the vehicles to be driven along the middle deck and means providing a lost motion connection between said top and middle decks for lifting said middle deck from its shipping elevation to a higher loading position when said top deck is lifted from said first to said second loading elevation to permit the vehicle to be driven along the bottom deck.

24. The combination set forth in claim 23 wherein said lost motion connection means comprises a plurality of lifting elements extending vertically between said top and middle decks at longitudinally spaced intervals along the longitudinal edges of said top and middle decks, said lifting elements being slidably connected to one of said top and middle decks and being operably connected for movement with the other of said top and middle decks such that said middle deck is lifted during vertical travel of said top deck between its first and second loading elevations.

25. The combination set forth in claim 23 wherein said top deck supporting and moving means comprises a pair of connector elements one extending along and supported by said frames above the second loading elevation of said top deck for movement lengthwise thereof, a plurality of rotatable members journalled on said frames at spaced intervals adjacent said connector elements, a plurality of flexible elements individually connected to said connector elements at spaced intervals therealong and running in the same direction over the corresponding one of said rotatable members and thence downwardly to a load carrying connection with said top deck, and means for simultaneously moving said pair of connector elements axially in the same direction for raising and lowering said top deck, said connector elements having higher resistance to elastic deformation resulting from tensile stress in the direction of their movement than said flexible elements, said lost motion connection means comprising a vertical rod adjacent each vertical run of said flexible elements and fixed to said top deck and having a sliding connection with said middle deck so that said middle deck is lifted by said rods during the upper portion of vertical travel of said top deck, said flexible elements and rods being disposed at longitudinally spaced intervals along the longitudinal edges of said middle and top decks to spread the load of said decks along said frames and to evenly distribute the hoisting force along said middle and top decks.

26. A rack structure for transporting wheeled vehicles thereon including in combination a lower deck extending lengthwise of the rack adapted for supporting wheeled vehicles thereon, an upper substantially imperforate deck adapted for supporting wheeled vehicles thereon and extending lengthwise of the rack above said lower deck, means for supporting said decks in vertically spaced relation such that said upper deck is vertically movable to increase and decrease the vertical clearance between said decks for respectively loading and shipping said vehicles on said lower deck, means operably connected to said deck supporting means for so vertically moving said upper deck, said upper deck comprising spaced sections for supporting said upper deck vehicles and to provide clearance spaces disposed one between each adjacent pair of said sections adapted to individually receive the highest body portions of vehicles positioned beneath said clearance spaces on the lower deck when said upper deck is lowered towards said lower deck, said support sections being substantially imperforate, substantially imperforate bridging sections supported on said upper deck one between each adjacent pair of said sections of said upper deck, said bridging sections being arched upwardly transversely of said upper deck above the level of said sections to provide vertical clearance in the associated clearance spaces for said reception therein of said portions of the lower deck vehicles when said upper deck is lowered towards said lower deck, and sloping transition plates connected one to each deck section and adjacent arched section along the mutually adjacent end edges thereof to provide a transition wheel track and cover therebetween as well as a transverse brace for said arched sections.

27. The combination set forth in claim 26 wherein said upper deck includes a pair of beams extending substantially the length of said deck along the side edges thereof, said upper deck sections extending transversely between said beams and being supported at the side edges thereof on said beams, said deck sections being spaced longitudinally to provide the clearance spaces one between the front and rear wheels of each vehicle supported on said upper deck, said beams comprising angle members having an upright flange providing a curb for said upper deck and an inwardly extending flange providing support for the side edges of said deck sections, said deck sections each comprising a metal plate with alternating substantially right angle corrugations extending transversely between said beams, said bridging sections each comprising a metal plate dimensioned to cover the width and length of the clearance space between adjacent deck sections, said plate being supported along the longitudinal side edges thereof on said upper deck.

28. A rack structure for transporting wheeled vehicles thereon including in combination a lower deck extending lengthwise of the rack adapted for supporting wheeled vehicles thereon, a unitary upper deck for supporting a plurality of wheeled vehicles thereon and extending lengthwise of the rack above said lower deck, means for supporting said decks in vertically spaced relation such that said upper deck is vertically movable to increase and decrease the vertical clearance between said decks for respectively loading and shipping said vehicles on said lower deck, means operably connected to said deck supporting means for so vertically moving said upper deck, said upper deck comprising vehicle supporting sections spaced longitudinally of the upper deck to provide a plurality of clearance spaces disposed one between each adjacent pair of said sections adapted to individually receive the highest body portions of vehicles positioned on said lower deck when said upper deck is lowered towards said lower deck, pairs of wheel skids disposed with one pair for each of the upper deck clearance spaces adapted to span the same lengthwise of the upper deck between adjacent upper deck sections and means for slidably supporting the opposite ends of said skids on the transverse edges of said upper deck sections to permit lateral sliding movement of said skids between a loading position wherein skids are positioned for alignment with the wheels of the vehicles received on said upper deck and a shipping position wherein said skids are disposed respectively adjacent the opposite sides of said upper deck to provide transverse clearance in each of said clearance spaces for said reception of the vehicle located therebelow.

References Cited by the Examiner
UNITED STATES PATENTS

| | | | |
|---|---|---|---|
| 1,276,556 | 8/1918 | Michod | 105—368 |
| 1,894,534 | 1/1933 | Dolan | 105—368.1 |
| 2,147,014 | 2/1939 | Demarest | 105—368 |
| 2,213,501 | 9/1940 | Mussey | 105—368 |
| 2,561,927 | 7/1951 | Janeczko | 105—370 |
| 2,636,772 | 4/1953 | Bridge | 105—368 |
| 2,690,141 | 9/1954 | King | 105—422 |
| 2,692,032 | 10/1954 | Peterson | 105—422 |
| 2,906,405 | 9/1959 | Erickson | 211—13 |
| 3,014,604 | 12/1961 | Loomis | 214—38 |
| 3,119,350 | 1/1964 | Bellingher | 105—370 |

MILTON BUCHLER, *Primary Examiner.*

JAMES S. SHANK, LEO QUACKENBUSH, *Examiners.*